US010718637B2

(12) United States Patent
Cai et al.

(10) Patent No.: US 10,718,637 B2
(45) Date of Patent: Jul. 21, 2020

(54) TORQUE AND ANGULAR SENSOR

(71) Applicant: China Automotive Systems, Inc., Wuhan (CN)

(72) Inventors: Haimian Cai, Ann Arbor, MI (US); Siqi Cheng, Madison Heights, MI (US); Changhe Huang, Novi, MI (US); Thaddeus Schroeder, Rochester Hills, MI (US); Christopher Mark Thrush, Shelby Township, MI (US)

(73) Assignee: CHINA AUTOMOTIVE SYSTEMS, INC., Wuhan (CN)

( * ) Notice: Subject to any disclaimer, the term of this patent is extended or adjusted under 35 U.S.C. 154(b) by 84 days.

(21) Appl. No.: 16/107,191

(22) Filed: Aug. 21, 2018

(65) Prior Publication Data

US 2018/0372513 A1  Dec. 27, 2018

Related U.S. Application Data

(60) Provisional application No. 62/523,541, filed on Jun. 22, 2017.

(51) Int. Cl.
  *G01D 5/20* (2006.01)
  *G01L 3/10* (2006.01)

(52) U.S. Cl.
  CPC ............ *G01D 5/2053* (2013.01); *G01L 3/105* (2013.01); *G01L 3/109* (2013.01); *G01D 5/2006* (2013.01)

(58) Field of Classification Search
  None
  See application file for complete search history.

(56) References Cited

U.S. PATENT DOCUMENTS 4,502,006 A * 2/1985 Goodwin ......... B60G 17/01933
                                               180/167
2006/0107764 A1  5/2006 Paek
(Continued)

FOREIGN PATENT DOCUMENTS

EP        0343074 A1   11/1989

OTHER PUBLICATIONS

International Search Report; PCT/US2018/047228; dated Dec. 12, 2018; 5 pages.
(Continued)

*Primary Examiner* — Jas A Sanghera
(74) *Attorney, Agent, or Firm* — Dickinson Wright PLLC

(57) ABSTRACT

A torque and angular sensor includes a differential angle sensor to precisely measure a differential angle between an input shaft and an output shaft and an angular position sensor to measure the angle of at least one of the shafts over a full angular range. The differential angle sensor measures an output rotation angle of an output target and an input rotation angle of an input target using changing voltages in taps on the input and output coils, which each carry an AC excitation current and which are each inductively coupled with teeth on targets fixed to rotate with one of the shafts. Input shaft rotation angle region is combined with the input angular position as a rotation angle composite. A raw torque angle is determined based on the difference between the input and output rotation angles. Rotational and Linear compensation provides a high-precision torque angle.

20 Claims, 27 Drawing Sheets

(56) References Cited

U.S. PATENT DOCUMENTS

2009/0267593 A1* 10/2009 Goto .................... B62D 6/10
 324/207.25
2011/0181302 A1* 7/2011 Shao .................... G01D 5/2225
 324/654

OTHER PUBLICATIONS

A Lecture on Accurate Inductive Voltage Dividers; Svetlana Avramov-Zamurovic et al; Jan. 1, 2002; 11 pages.

* cited by examiner

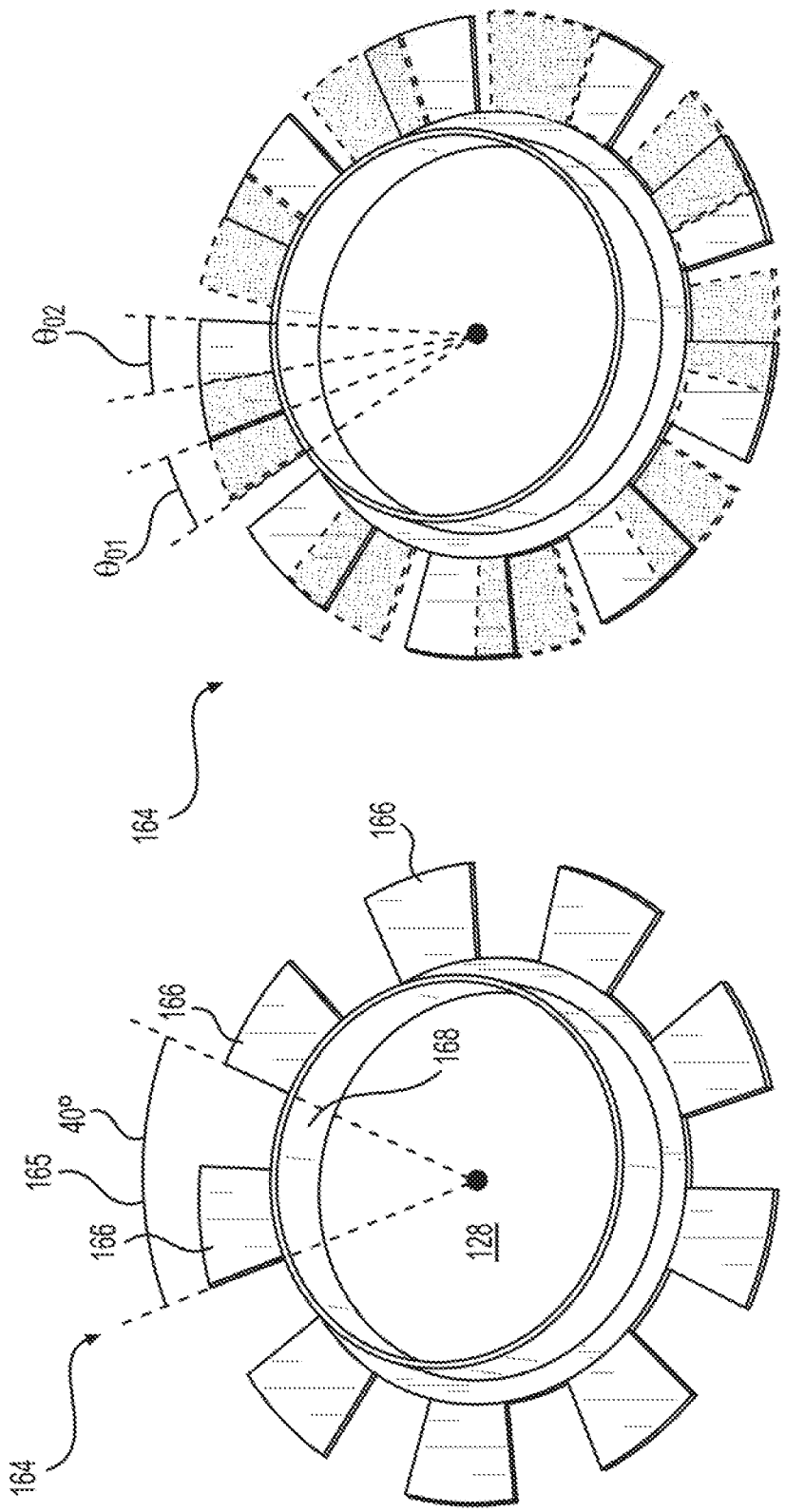

TORQUE AND ANGULAR SENSOR

CROSS REFERENCE TO RELATED APPLICATION

This U.S. utility patent application claims the benefit of U.S. provisional patent application No. 62/523,541, filed Jun. 22, 2017, the contents of which are incorporated herein by reference in its entirety.

BACKGROUND OF THE INVENTION

1. Field of the Invention

The present disclosure relates generally to sensors for measuring rotation angle. More specifically, the present disclosure relates to a sensor for measuring a torque angle as a difference between angles of two rotating members.

2. Description of the Related Art

In an Electrical Power Steering system, a steering column includes a torsion element (torsion beam) between an input shaft and output shaft. Thus, as a driver turns the steering wheel, it causes the torsion beam to twist. The twisting and the rotation of the torsion element (torsion beam) is measured by sensors, and output to a system controlling the movement.

Thus, the ability to measure the torque and angular movement of the torsion element is required to operate such a power steering system. The measured movement is translated to a vehicle operation.

Torque and angular sensors are often employed in power steering embodiments to detect a twist input on a torsion beam, which may also be called a "torsion bar." This information may be coupled to a power steering system, and ultimately used to operate and control a vehicle. For example, FIG. 1 illustrates a prior art sensor 10 for measuring a torque angle, or a differential angle between an input shaft 20 and an output shaft 22, with a torsion beam 24 fixed therebetween. The prior art sensor 10 includes a first rotor 26 fixed to rotate with the input shaft 20 and a second rotor 28 fixed to rotate with the output shaft 22. An excitation coil 30 is disposed between the rotors 26, 28. Rotation of either or both of the shafts 20, 22 causes a variation in eddy currents in one or more of the rotors 26, 28, and which are sensed by first sensing coils 32, which are electrically connected to a first application specific integrated circuit (ASIC) 34, which also provides power to the excitation coil 30. As indicated by the arrows, three of the first sensing coils 32 are associated with each of the rotors 26, 28. Likewise, rotation of either or both of the shafts 20, 22 causes a variation in eddy currents in one or more of the rotors 26, 28, and which are sensed by second sensing coils 38, which are electrically connected to a second application specific integrated circuit (ASIC) 40, which also provides power to the excitation coil 30. As indicated by the arrows, three of the second sensing coils 38 are associated with each of the rotors 26, 28. Each of the ASICS 34, 40 provides an associated rotor position signal 36, 42 to an electronic control unit (ECU) 44, which includes a differential angle calculator 46, configured to generate a differential output signal 48 and an error status output 50 based on the difference between the angular positions of the shafts 20, 22.

The prior art torque and angular sensor 10 described above requires at least six inductive elements and a specific set of logic to accomplish angular sensing based on a torsion beam implementation. Accordingly, a continuing need exists for an improved torque and angular sensor that includes fewer inductive elements and which can provide improved accuracy and reliability over existing torque and angular sensors 10.

BRIEF SUMMARY OF THE INVENTION

A torque angle sensor for measuring a torque angle between an input shaft and an output shaft comprises an input target fixed to rotate with the input shaft and including a plurality of input teeth and an output target fixed to rotate with the output shaft and including a plurality of output teeth. At least one output coil is disposed adjacent to the output target and inductively coupled with at least one of the output teeth. The output coil includes a first output tap having an output voltage that varies with a first output rotation angle of the output target. At least one input coil is disposed adjacent to the input target and inductively coupled with at least one of the input teeth. The input coil includes a first input tap having an input voltage that varies with a first input rotation angle of the input target.

At least one of the output coil or the input coil is electrically connected between a common ground and a first AC source providing an excitation current therethrough. The first processor is configured to monitor the output voltage and to determine the first output rotation angle of the output target over an output angle range. The first processor is also configured to monitor the input voltage and determine the first input rotation angle of the input target over an input angle range.

In accordance with another aspect of the disclosure, a torque angle sensor is provided for measuring a torque angle between an input shaft and an output shaft. The torque angle sensor includes a differential angle sensor configured to determine a raw torque angle as the difference between an output rotation angle of an output target over an output angle range and an input rotation angle of an input target over an input angle range. The differential angle sensor is configured to determine the output rotation angle using an electrical characteristic of at least one output coil located proximate to the output target. The differential angle sensor is also configured to determine the input rotation angle using an electrical characteristic of at least one input coil located proximate to the input target. The torque angle sensor also includes an angular position sensor configured to determine an input angular region of the input shaft over a full angular range which is larger than each of the output angle range and the input angle range. The torque angle sensor also includes a composite input shaft position calculator, which is configured to calculate a composite input shaft position by combining the input angular region from the angular position sensor with the input rotation angle.

The present disclosure also includes a method for determining a torque angle. The method includes applying a first excitation voltage to a first coil and to a second coil, with each of the first coil and the second coil located adjacent to a first target having a plurality of first teeth and being fixed to rotate with an output shaft or an input shaft; generating a first voltage on a first tap on the first coil, with the first voltage varying sinusoidally with a rotation angle of the first target over a first angle range; generating a second voltage on a second tap on the second coil, with the second voltage varying sinusoidally with a rotation angle of the first target and shifted in phase from the first voltage. The method also includes measuring the first voltage and the second voltage by a processor; scaling the first voltage by the processor to determine a first scaled coil value; scaling the second voltage by the processor to determine a second scaled coil value; and determining the first rotation angle of the first target within the first angle range by the processor using the first scaled coil value and the second scaled coil value.

The torque angle sensor of the present disclosure provides several advantages over devices of the prior art. It provides for improved accuracy and for multiple different and independent layers of redundancy which allow it to produce an accurate measurement of torque angle even if multiple different components of the torque angle sensor malfunction. The torque angle sensor of the present disclosure also allows a source of torque applied to a torsion beam to be determined. By quickly and accurately measuring both the torque and angular values of the torsion element in response to steering wheel changes, vehicle operation may be summarily improved as well.

BRIEF DESCRIPTION OF THE DRAWINGS

Further details, features and advantages of designs of the invention result from the following description of embodiment examples in reference to the associated drawings.

FIG. 8A is an isolated perspective view of an output target of the torque and angular sensor of the present disclosure in a first position;

FIG. 8B is an isolated perspective view of the output target of FIG. 8A rotated between the first position and a second position;

DETAILED DESCRIPTION OF THE PREFERRED EMBODIMENTS

Figure 1:
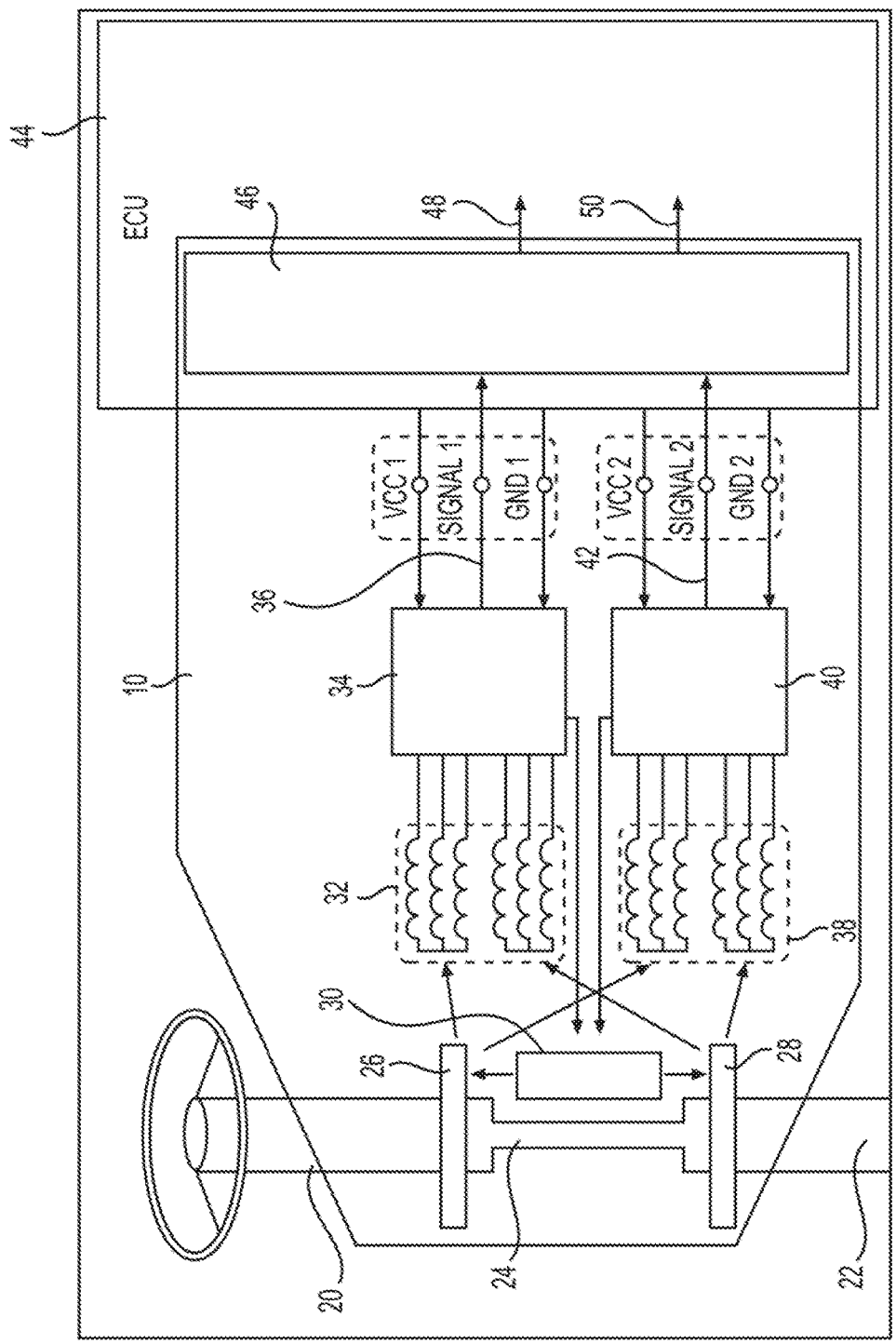
FIG. 1 is a schematic diagram of a prior art sensor for measuring a torque angle in a steering column of a vehicle.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Figure 25:
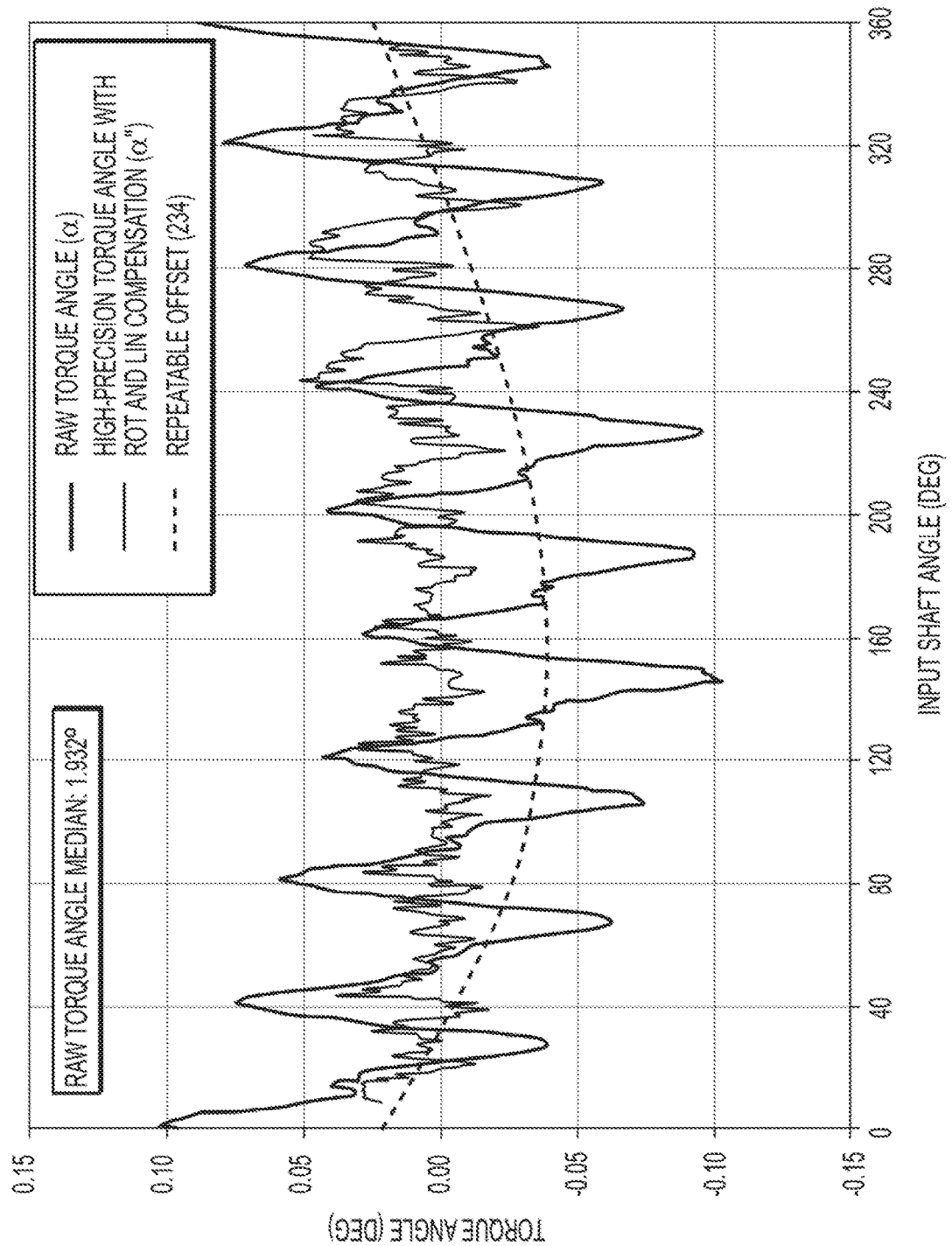
FIG. 25 is a graph of torque angle as a function of input shaft angle for both a sensor of the prior art and for the torque and angular sensor of the present disclosure with rotational and linear compensation.
Figure 26A:
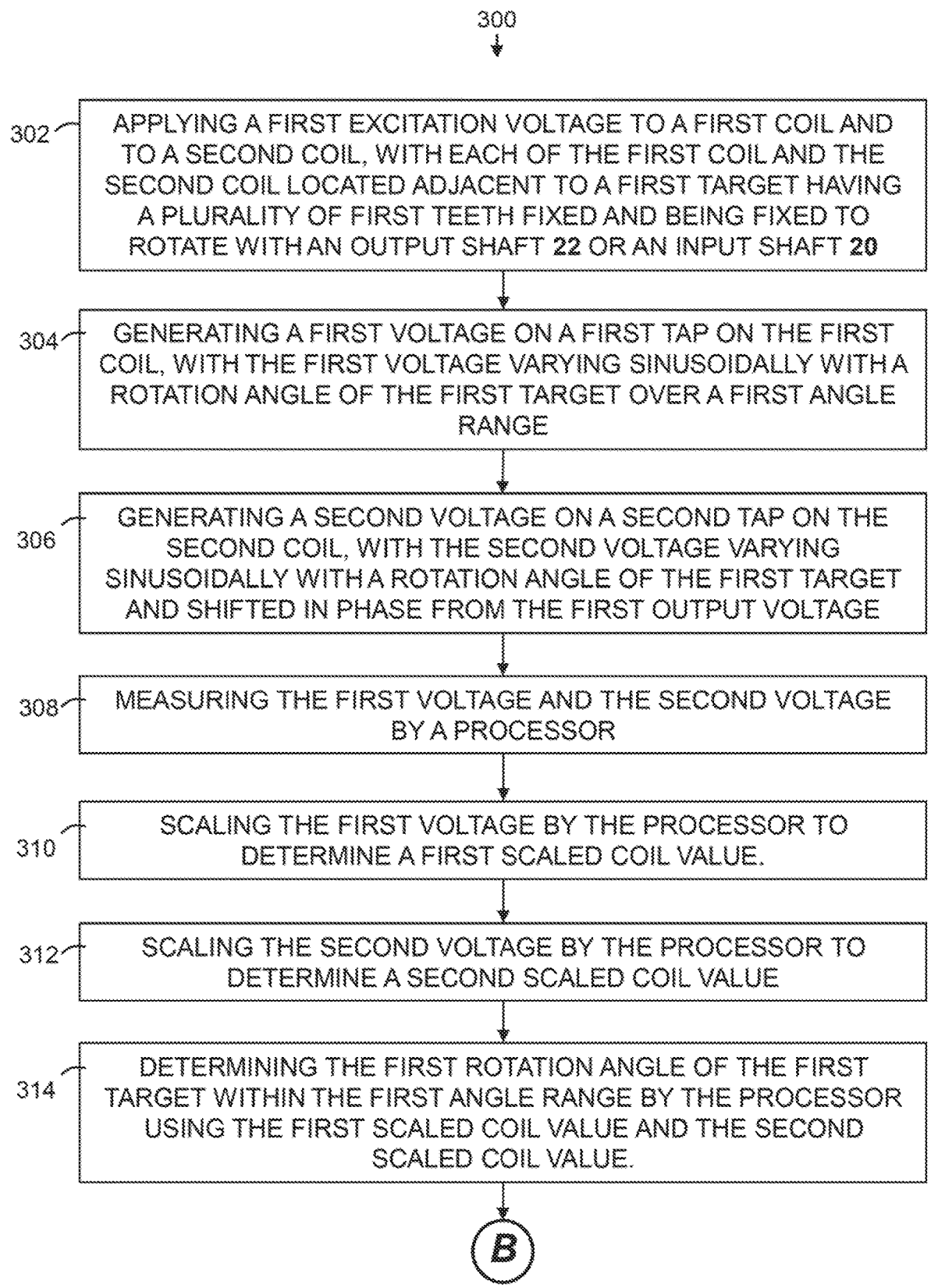
FIG. 26A is a flow chart listing steps in a method for determining a torque angle by a torque and angular sensor of the present disclosure.
Figure 26B:
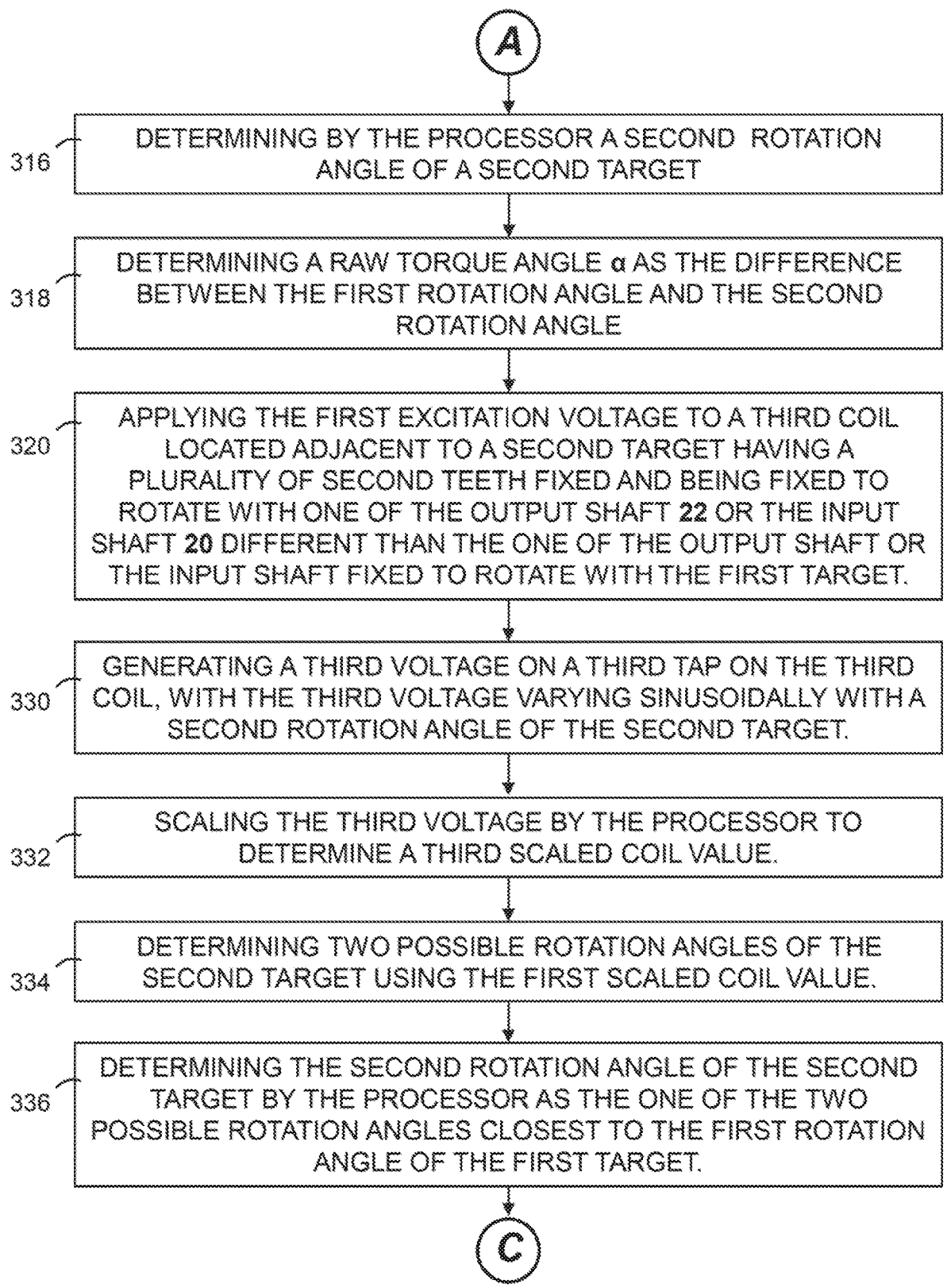
FIG. 26B is a continuation of the flow chart of FIG. 26A
Figure 26C:
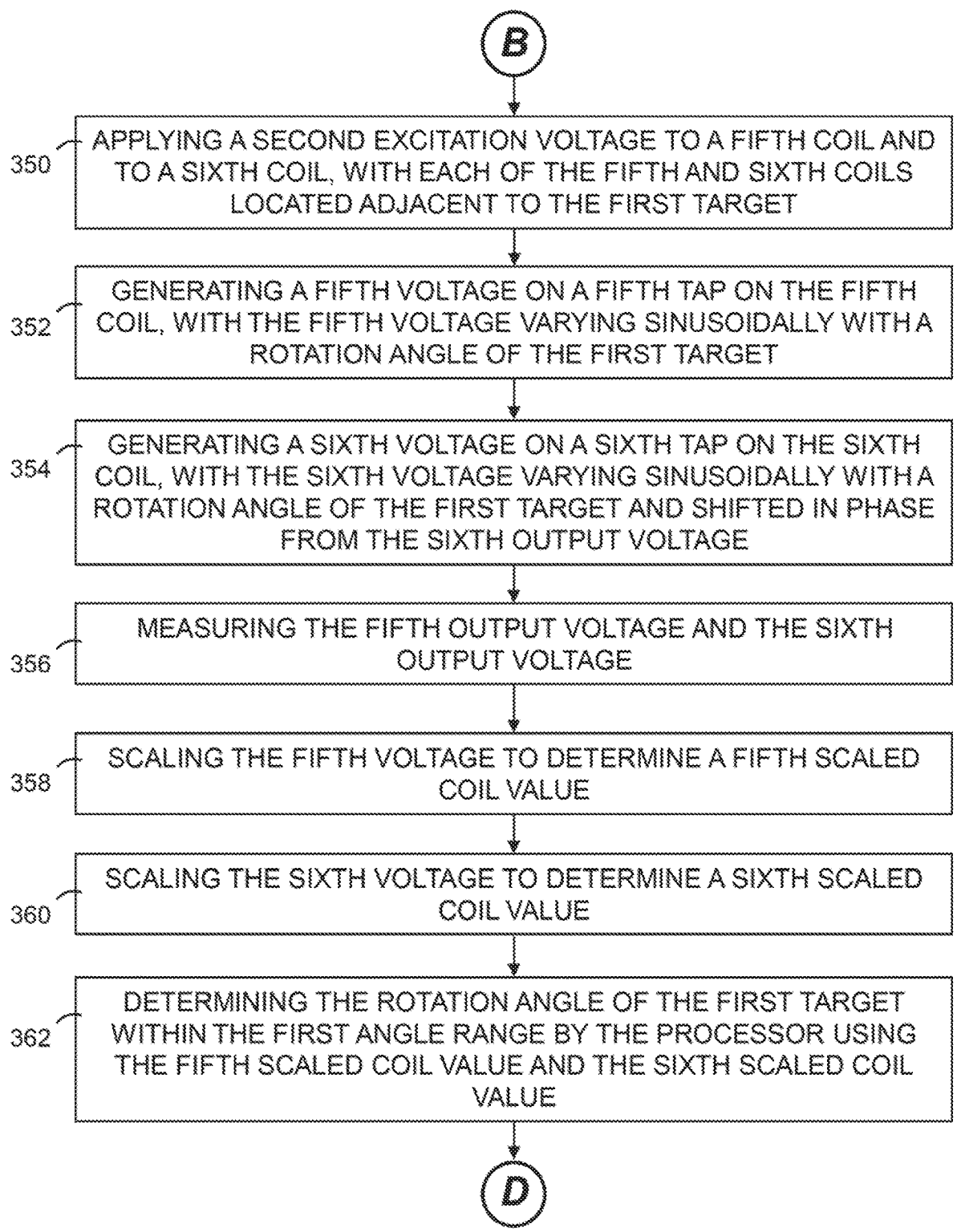
FIG. 26C is another continuation of the flow chart of FIG. 26A.
Figure 26D:
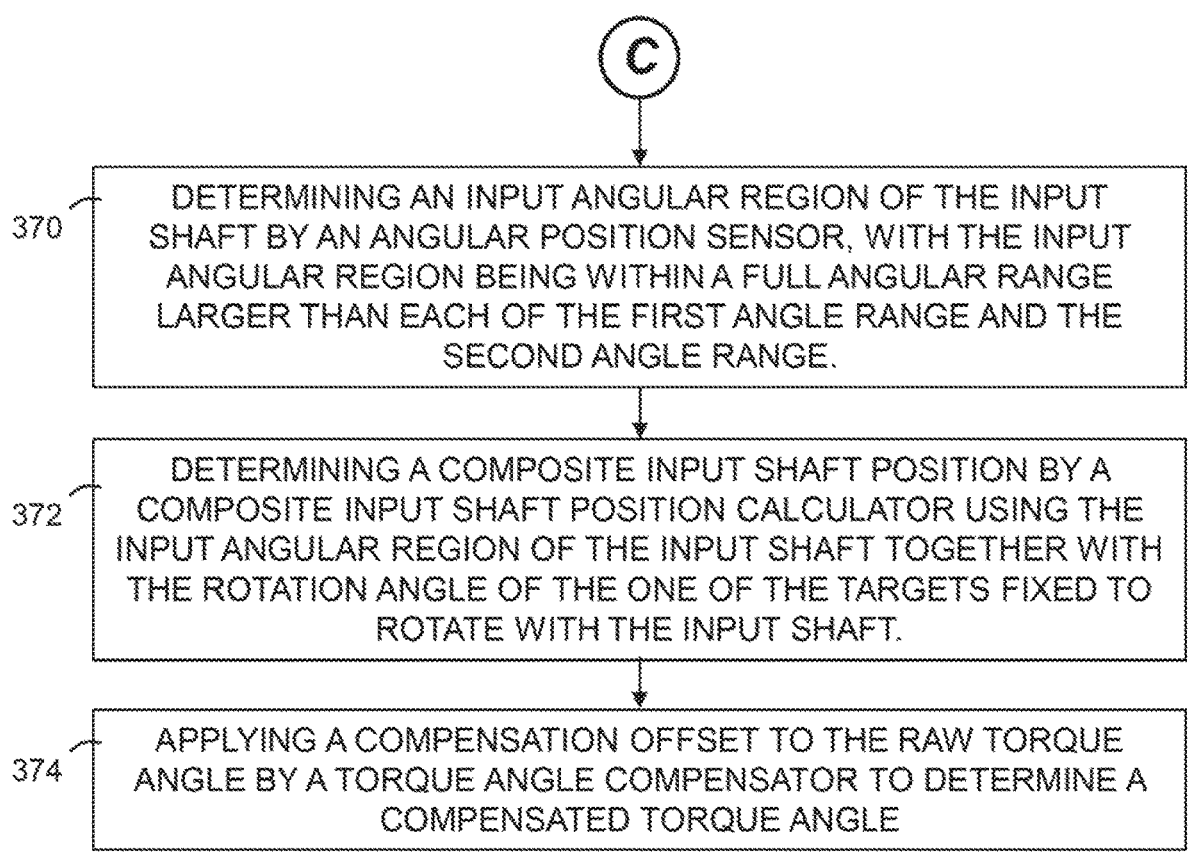
FIG. 26D is another continuation of the flow chart of FIG. 26A.

Disclosed herein are devices, methods and systems for implementing a torque and angular sensor 110. By employing the aspects disclosed herein, an implementer may realize a sensor incorporating an efficient use of inductive elements and control logic. In other words, comparing and contrasting FIG. 1 with FIG. 2, the torque and angular sensor 110 of the present disclosure requires fewer inductive coils than sensors of the prior art 10. For example, the differential angle sensor 112 of the present disclosure does not require a separate excitation coil 30 as used in torque and angular sensors of the prior art 10. Further, and as illustrated in FIG. 25, the aspects disclosed herein lead to a more accurate sensing of torque via a monitored torsion beam 24. Thus, the implementations described herein may allow an implementer to realize a more compact structure, while achieving cost-savings associated with the number of components used.

The subject torque and angular sensor 110 includes a differential angle sensor 112 that determines a differential angle, also called a torque angle α, between an input shaft 20 and an output shaft 22, with a torsion beam 24 fixed therebetween. As shown on FIG. 2, the differential angle sensor 112 of the present disclosure includes an input target 148 fixed to rotate with the input shaft 20 and an output target 164 fixed to rotate with the output shaft 22. A first processor 184 is in electrical communication with a first input coil $L_{181}$ and a second input coil $L_{182}$ which are each measurably influenced by the rotary position of the input target 148 as indicated by the arrow therebetween. The first processor 184 is also in electrical communication with a first output coil $L_{91}$ and a second output coil $L_{92}$ which are each measurably influenced by the rotary position of the output target 164 as indicated by the arrow therebetween. The first processor 184 includes a first output channel 186 for communicating the torque angle α to an external device.

Figure 2:
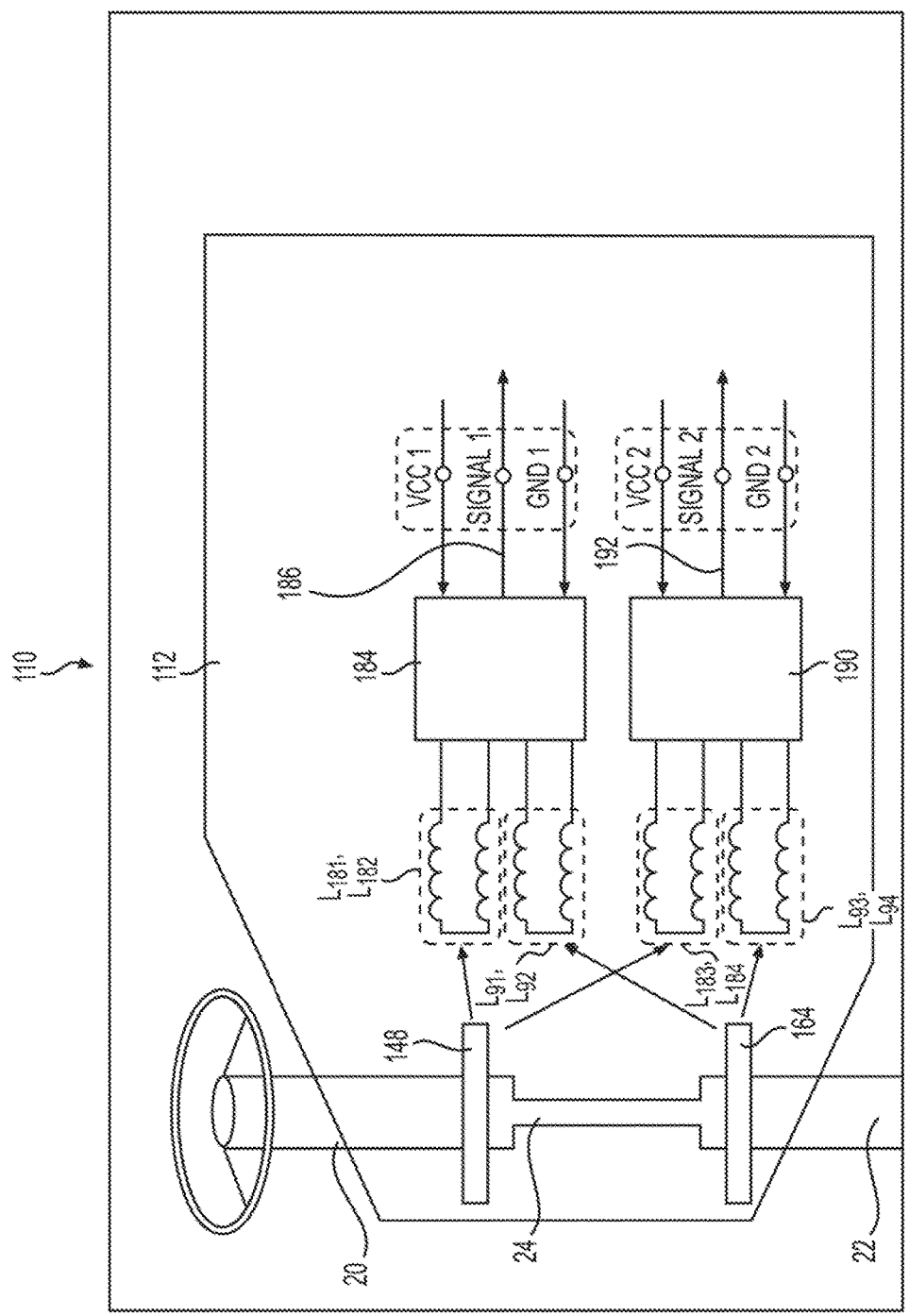
FIG. 2 is a schematic diagram of a torque and angular sensor of the present disclosure.

The differential angle sensor 112 shown in FIG. 2 also includes a second processor 190, which is in electrical communication with a third input coil $L_{183}$ and a fourth input coil $L_{184}$ which are each measurably influenced by the rotary position of the input target 148 as indicated by the arrow therebetween. The second processor 190 is also in electrical communication with a third output coil $L_{93}$ and a fourth output coil $L_{94}$ which are each measurably influenced by the rotary position of the output target 164 as indicated by the arrow therebetween. The second processor 190 includes a second output channel 192 for communicating the torque angle α to an external device.

Figure 3:
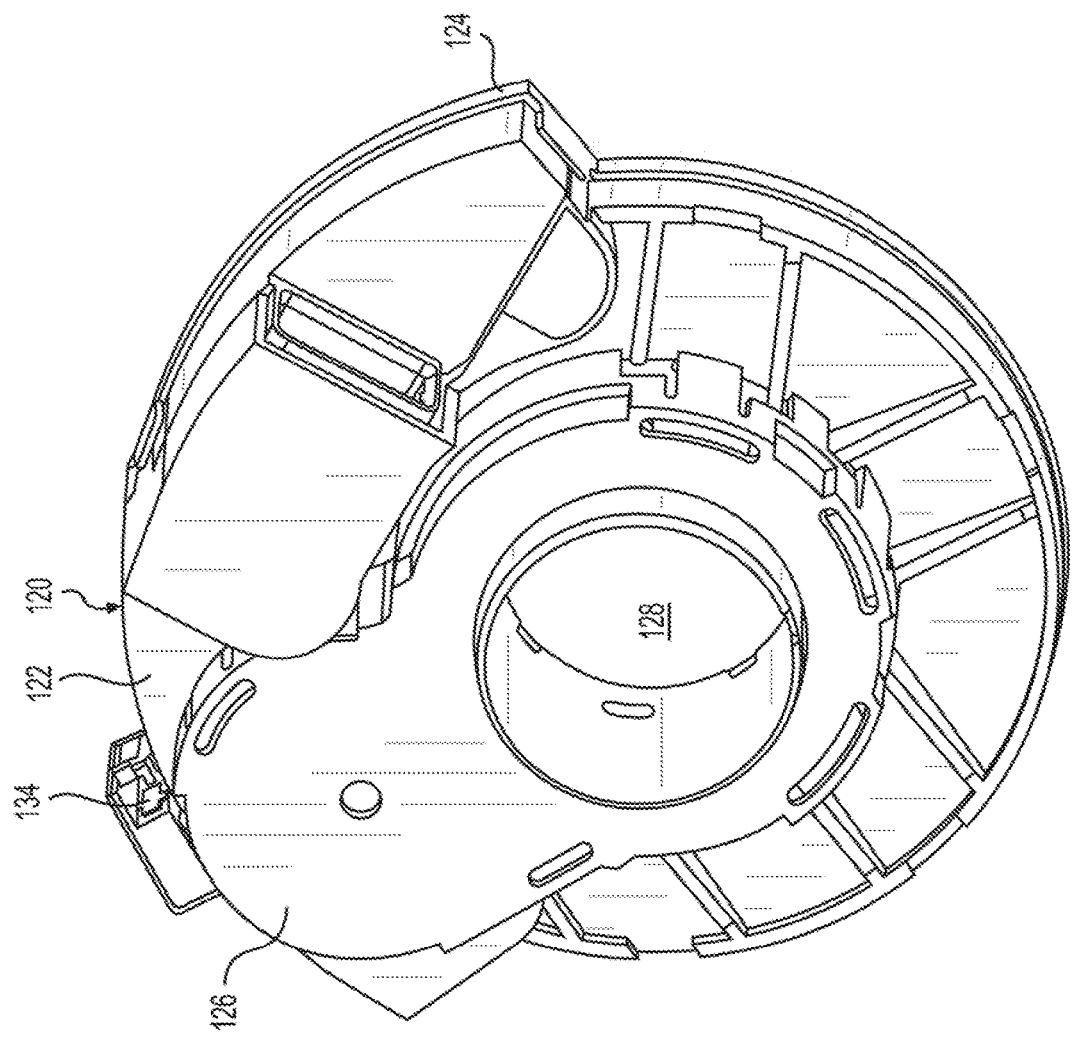
FIG. 3 is a perspective view of a torque and angular sensor of the present disclosure.
Figure 4:
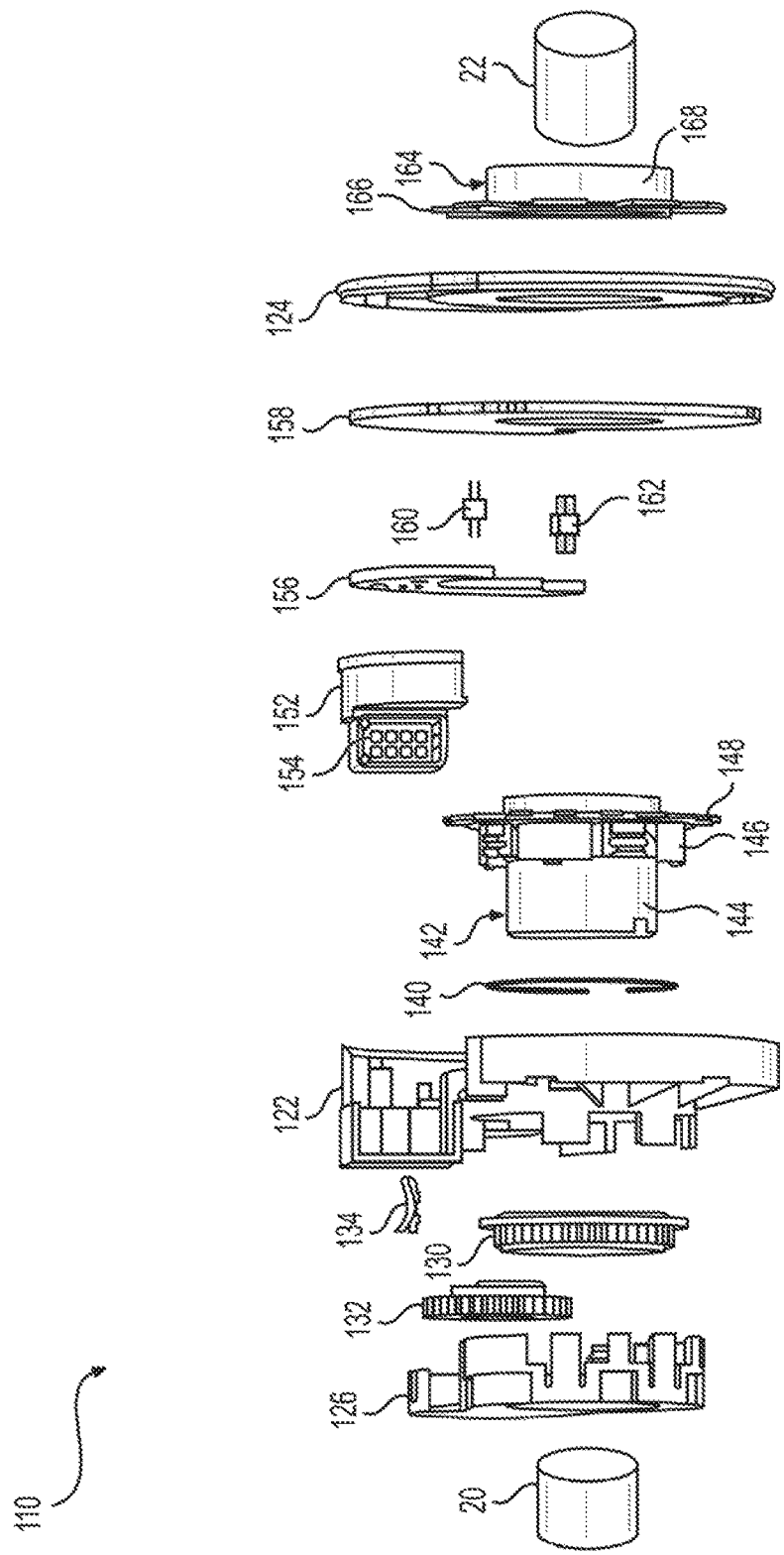
FIG. 4 is an exploded side view of the torque and angular sensor of the present disclosure.
Figure 5:
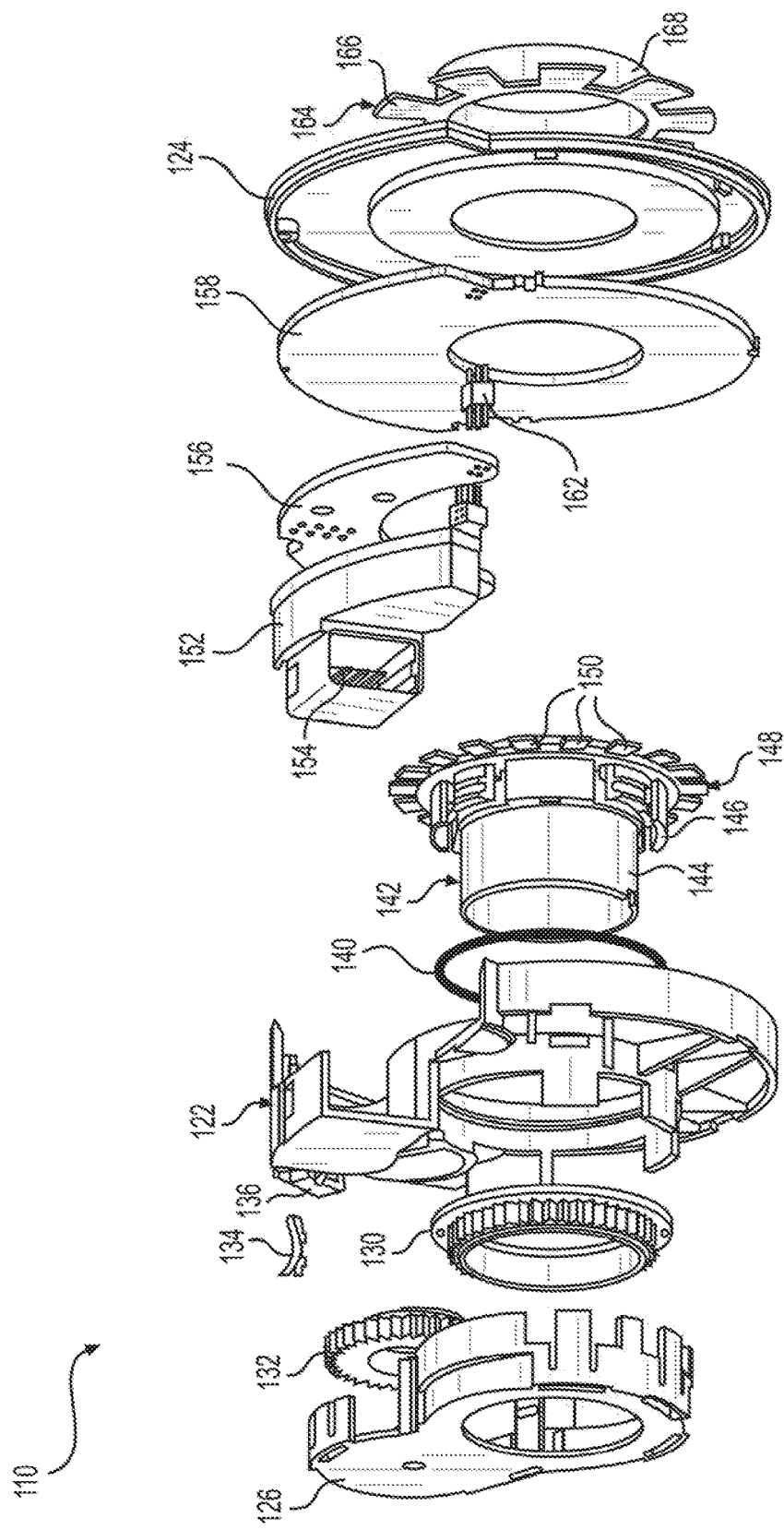
FIG. 5 is an exploded perspective view of the torque and angular sensor of the present disclosure.
Figure 6:
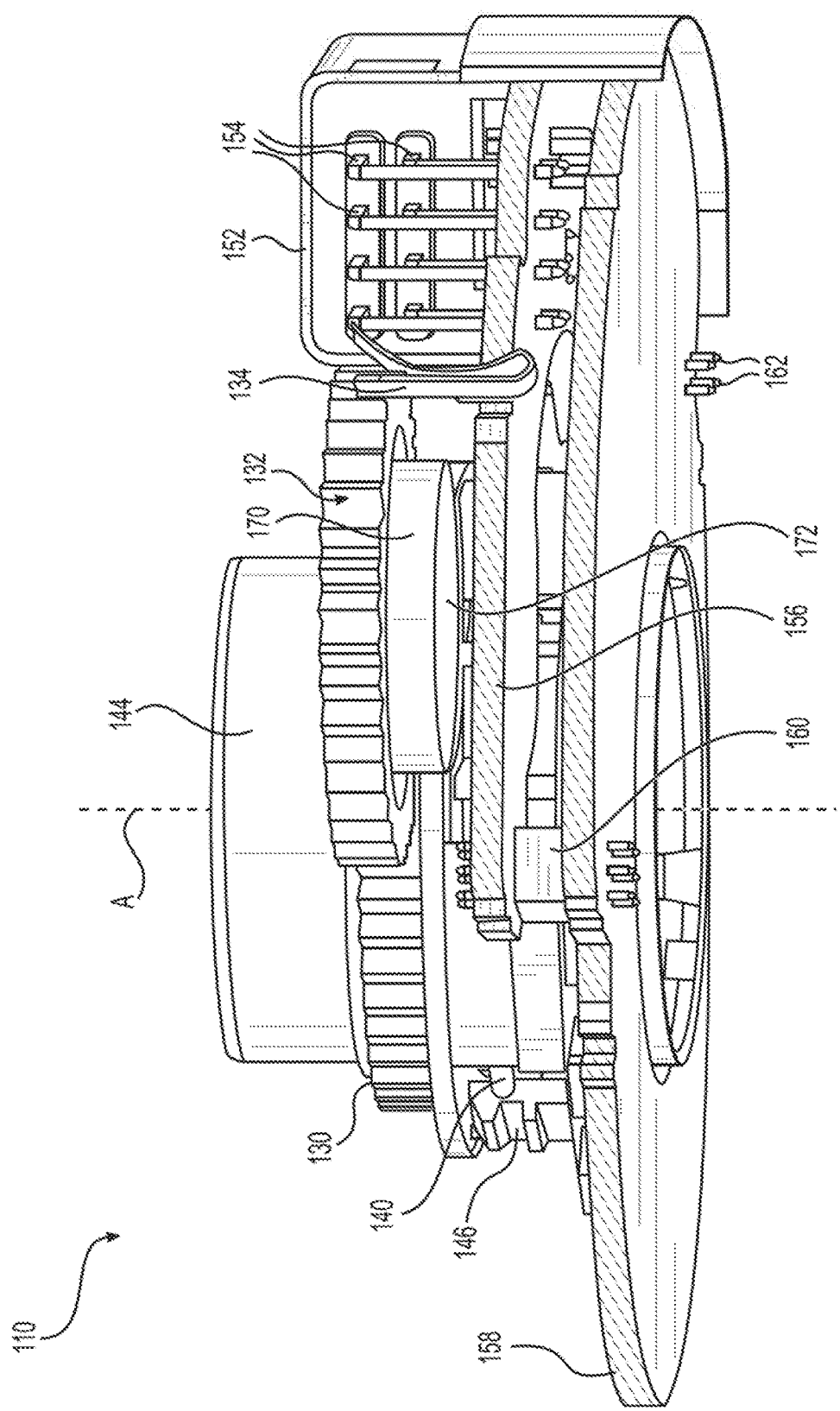
FIG. 6 is a perspective view of internal components of the torque and angular sensor of the present disclosure.

An example embodiment of a torque and angular sensor 110 is generally shown in FIGS. 3-6, with additional aspects and functionality of the torque and angular sensor 110 illustrated in the subsequent FIGS. FIGS. 4 and 5 are exploded views from two different angles, and FIG. 6 shows internal components of the torque and angular sensor 110 of the present disclosure with the enclosure 120 removed. As shown in FIG. 3, the torque and angular sensor 110 includes an enclosure 120 having an upper housing 122 and a lower housing 124 in a clamshell arrangement with a gearset cover 126 overlying the upper housing 122. Together, the enclosure 120 is generally donut-shaped with a central bore 128 passing through the center for allowing a torsion beam (not shown) to pass therethrough. The torque and angular sensor 110 provides a torque angle α, based upon the difference in rotation angles between an input shaft 20 and an output shaft 22, which corresponds to the amount of twist in a torsion beam 24 fixed to each of the input and output shafts 20, 22.

With knowledge of the characteristics of the torsion beam 24, such as a spring rate, a controller external to the torque and angular sensor 110, such as an ECU or a controller of a power steering system, may use the torque angle α provided by the subject torque angle sensor 110 to determine an amount of torque applied to either of the shafts 20, 22.

As shown in FIGS. 4-6, the torque and angular sensor 110 also includes a first gear 130 fixed to rotate with the input shaft 20. A second gear 132 is disposed in meshed engagement with the first gear 130 and includes a fewer number of teeth and therefore rotates at a larger angular rate than the input shaft 20. FIGS. 4-6 also show a spring clip 134 comprised of metal, such as spring steel, which is disposed within a rectangular protrusion 136 of the upper housing 122 and which may be used for mounting the torque and angular sensor 110 on a corresponding structure of a vehicle.

Figure 10:
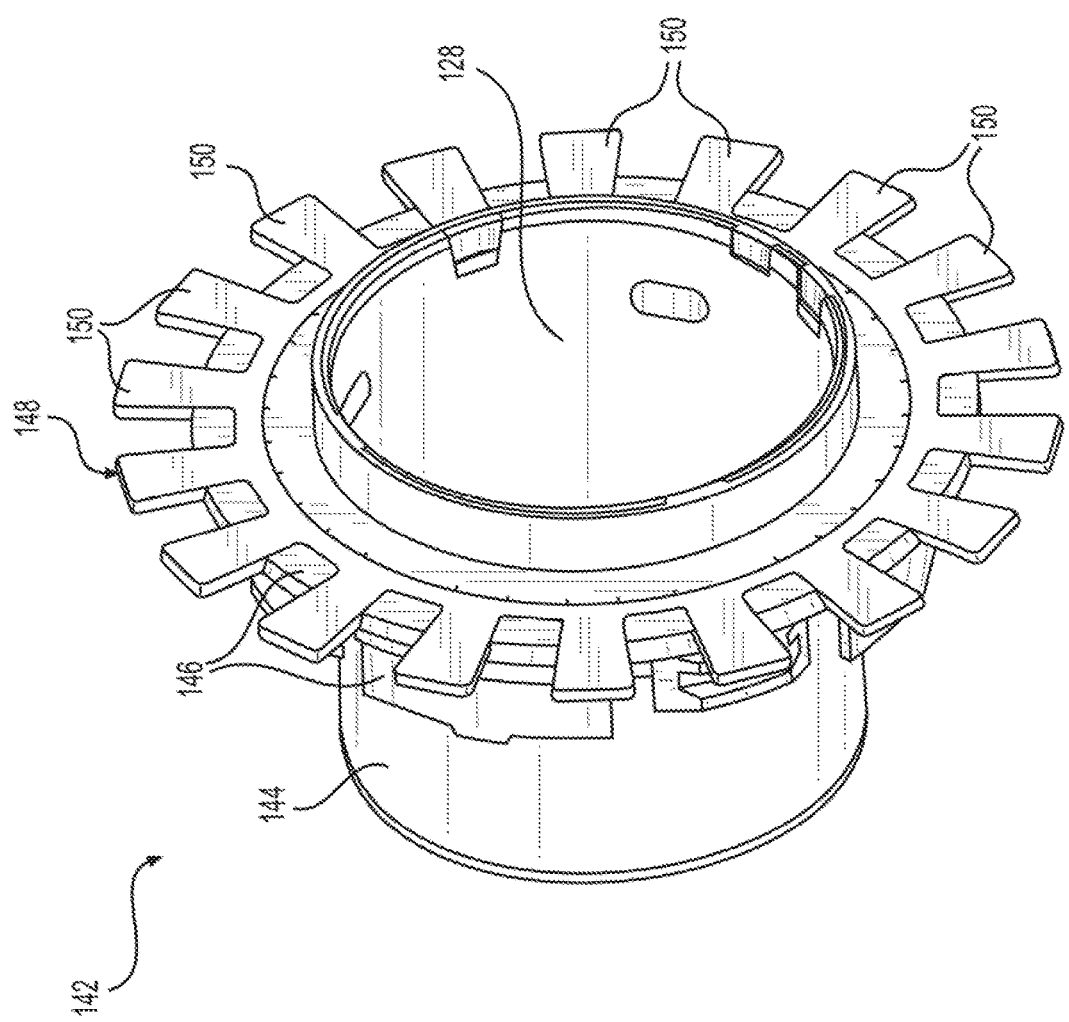
FIG. 10 is an isolated perspective view of an input rotor assembly of the torque and angular sensor of the present disclosure.

FIGS. 4 and 5 each show a retainer ring 140, which is preferably a C-shaped ring of metal, for holding an input rotor assembly 142 in position within the upper housing 122 of the enclosure 120. The input rotor assembly 142 includes an input sleeve 144, which has a tubular shape for mating with the input shaft 20 to cause the input rotor assembly 142 to rotate together with the input shaft 20. The input rotor assembly 142 is also detailed in FIG. 10 and includes a target support member 146 holding an input target 148 of metal such as sheet steel, which includes a plurality of input teeth 150, which preferably includes eighteen input teeth 150, each having a wedge shape and extending radially outwardly and equidistantly spaced about the input target 148. The input teeth 150 could also extend radially inwardly, and may, for example, extend radially inwardly from a ring, a cylinder, or another support structure.

FIGS. 4-6 also show a receptacle cover 152, which may be formed of molded plastic, which defines an electrical interface 154 for connection to a wiring harness to provide power to the torque and angular sensor 110 and for allowing the torque and angular sensor 110 to communicate to external devices, such as one or more vehicle controllers. The electrical interface 154 is in electrical communication with an angular position printed circuit board (PCB) 156 and a differential angle printed circuit board (PCB) 158. Each of the printed circuit boards 156, 158 are disposed parallel and spaced apart from one another and are perpendicular to a central axis A extending through the central bore 128. The printed circuit boards 156, 158 are held in position and are electrically connected via a first interconnector 160 and a second interconnector 162, each having several metal pins and a central block of electrically insulating material such as plastic.

FIGS. 4 and 5 each also show an output target 164 including a plurality of output teeth 166, preferably including nine output teeth 166, each having a wedge shape extending radially outwardly and equidistantly spaced thereabout. The output teeth 166 could also extend radially inwardly, and may, for example, extend radially inwardly from a ring, a cylinder, or another support structure. The output target 164 includes an output sleeve 168, which is generally tubular and is fixed to rotate with the output shaft 22. The output target 164 is located outside of the enclosure 120, with the lower housing 124 separating the output target 164 from the differential angle PCB 158.

As best shown on FIG. 6, the second gear 132 includes a cylindrical portion 170 extending axially downwardly to an end face 172 that is parallel to and adjacent but spaced apart from the angular position PCB 158. The cylindrical portion 170 of the second gear 132 holds a segment target (not shown) of conductive material such as copper upon a 180 degree semicircular half of the end face 172. Alternatively, the segment target may be embedded within the cylindrical portion 170 of the second gear 132, proximate to the end face 172. As detailed later in this disclosure, the angular position PCB 158 is configured to determine the position of the second gear 132 via non-contact means, which allows the torque and angular sensor 110 to determine a input shaft rotation angle region $\theta_{i\text{-}reg}$, which is an approximate rotary position of the input shaft 20 throughout its complete full angular range, which may be 360 degrees or larger.

Figure 7:
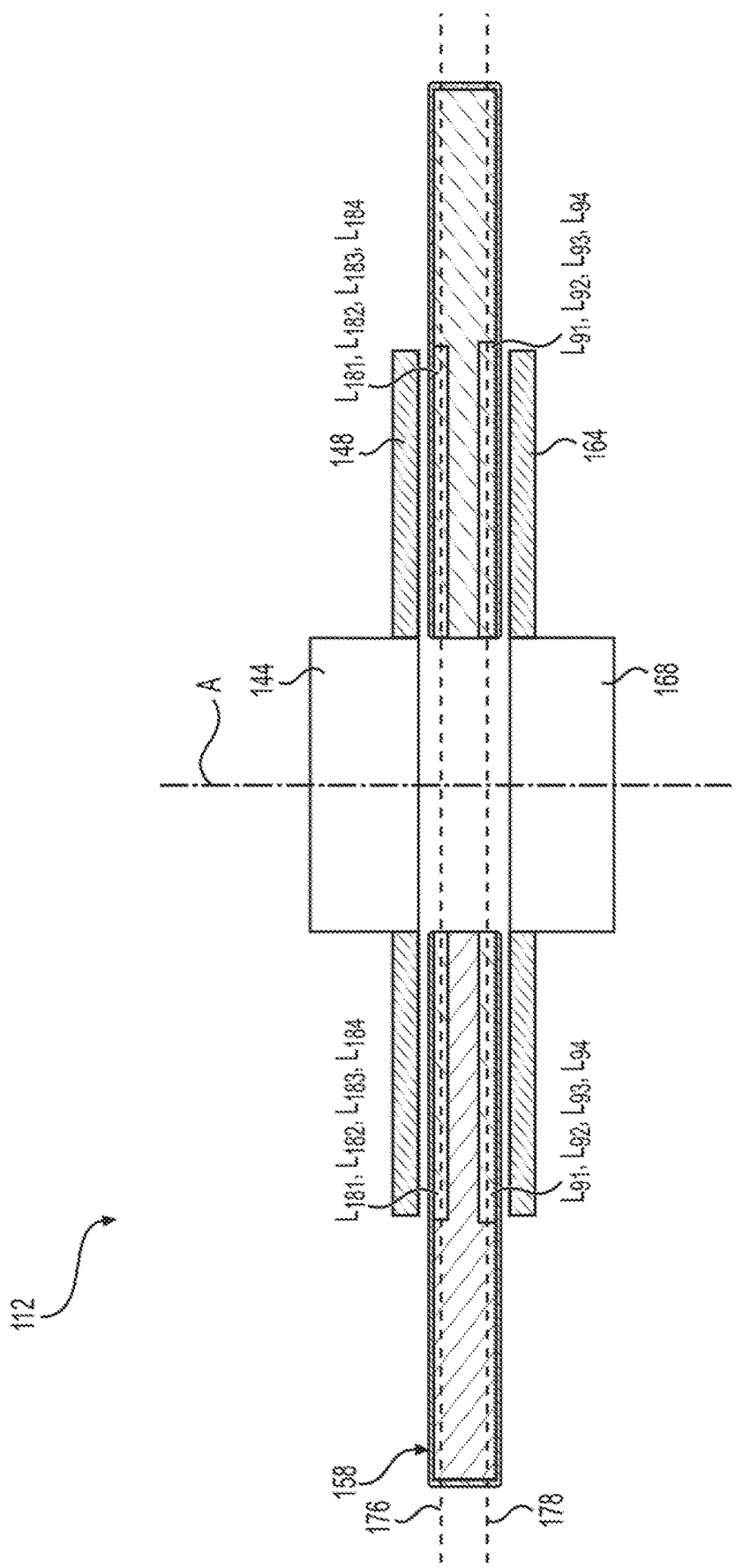
FIG. 7 is cross-sectional view of a differential angle sensor within the torque and angular sensor of the present disclosure.

As illustrated in FIG. 7, the differential angle PCB 158 extends parallel between and proximate to each of the input target 148 and the output target 164. The differential angle PCB 158 defines a first input coil $L_{181}$, a second input coil $L_{182}$, a third input coil $L_{183}$, and a fourth input coil $L_{184}$, each extending about a first plane 176 that is adjacent to the input target 148. The differential angle PCB 158 also defines a first output coil $L_{91}$, a second output coil $L_{92}$, a third output coil $L_{93}$, and a fourth output coil $L_{94}$, each extending about a second plane 178 that is adjacent to the output target 164. The output coils $L_{91}$, $L_{92}$, $L_{93}$, $L_{94}$ are each inductively coupled with one or more of the output teeth 166. The output coils $L_{91}$, $L_{92}$, $L_{93}$, $L_{94}$ are therefore effected by eddy currents in the output teeth 166. Likewise, the input coils $L_{181}$, $L_{182}$, $L_{183}$, $L_{184}$, and are each inductively coupled with the one or more of the input teeth 150 and are therefore effected by eddy currents in the input teeth 166.

Figure 13:
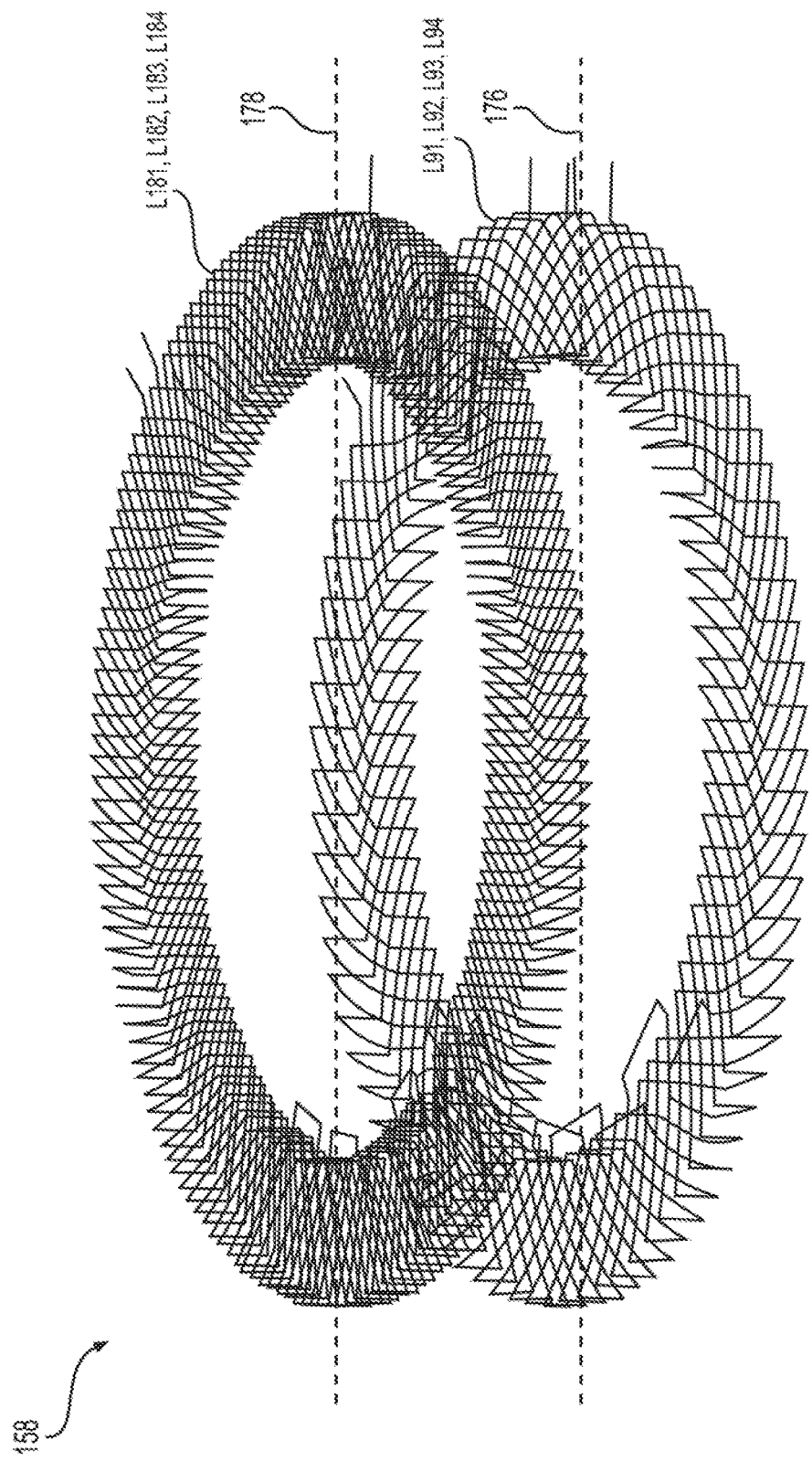
FIG. 13 is a perspective view of conductive paths in parallel planes within a differential angle PCB of the torque and angular sensor of the present disclosure.

The input coils $L_{181}$, $L_{182}$, $L_{183}$, $L_{184}$, and the output coils $L_{91}$, $L_{92}$, $L_{93}$, $L_{94}$ are each defined by traces in two or more different layers of the differential angle PCB 158. A 3-dimensional perspective view of the input coils $L_{181}$, $L_{182}$, $L_{183}$, $L_{184}$ and the output coils $L_{91}$, $L_{92}$, $L_{93}$, $L_{94}$ within the differential angle PCB 158 is shown in FIG. 13.

FIG. 8A is a perspective view of the output target 164 including the nine output teeth 166, each extending radially outwardly and equidistantly spaced thereabout. The output teeth 166 are each spaced-apart in a circumferential direction by a distance approximately equal to two-thirds of the circumferential width of each of the output teeth 166. FIG. 9A also shows locating tabs 174 equidistantly and circumferentially spaced about the input target 148 and each extending radially inwardly.

FIG. 8B shows the output target 164 rotated from a first position to a second position and illustrates the first output rotation angle $\theta_{o1}$, which is equal to the second output rotation angle $\theta_{o2}$. The positions of the portion of the output target 164 that corresponds to the output rotation angles $\theta_{o1}$, $\theta_{o2}$, differ from the actual positions to simplify illustration. The actual positions may be different and may cause the respective output rotation angles $\theta_{o1}$, $\theta_{o2}$ to overlap one another. In practice, the structures associated with the first and second output rotation angles $\theta_{o1}$, $\theta_{o2}$ depend on the positions of the respective output coils $L_{91}$, $L_{92}$, $L_{93}$, $L_{94}$ and are preferably 45 degrees offset from one another.

FIG. 9A is a perspective view of the input target 148 including the eighteen input teeth 150, each extending radially outwardly and regularly spaced thereabout. The input teeth 150 are each spaced-apart in a circumferential direction by a distance approximately equal to two-thirds of the circumferential width of each of the input teeth 150. The locating tabs 174 are each circumferentially aligned with the spaces between the input teeth 150. As shown on FIG. 10, the input target 164 is secured upon and within the target support member 146 to rotate therewith and to therefore rotate together with the input shaft 20.

Figure 9B:
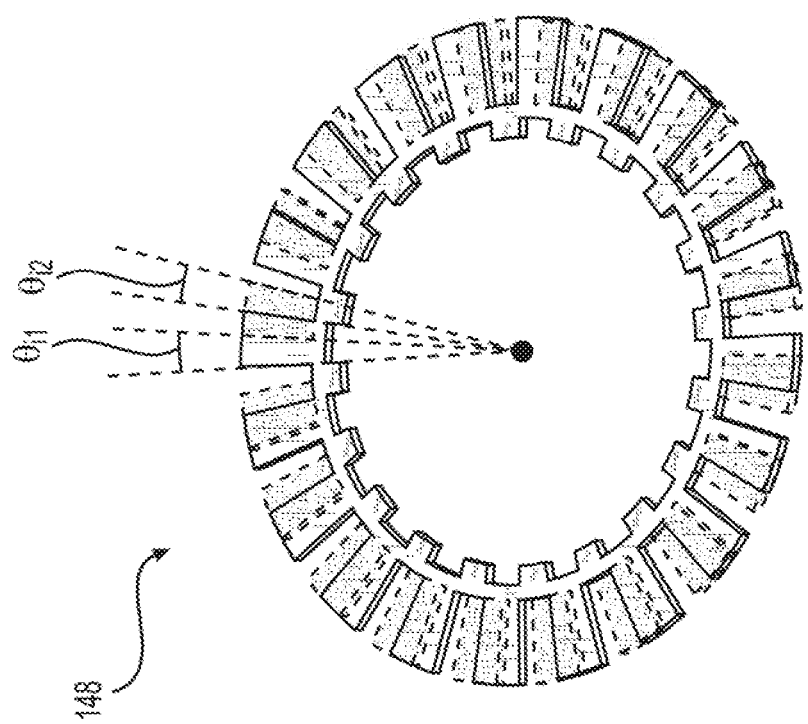
FIG. 9B is an isolated perspective view of the input target of FIG. 9A rotated between the first position and a second position.
Figure 9A:
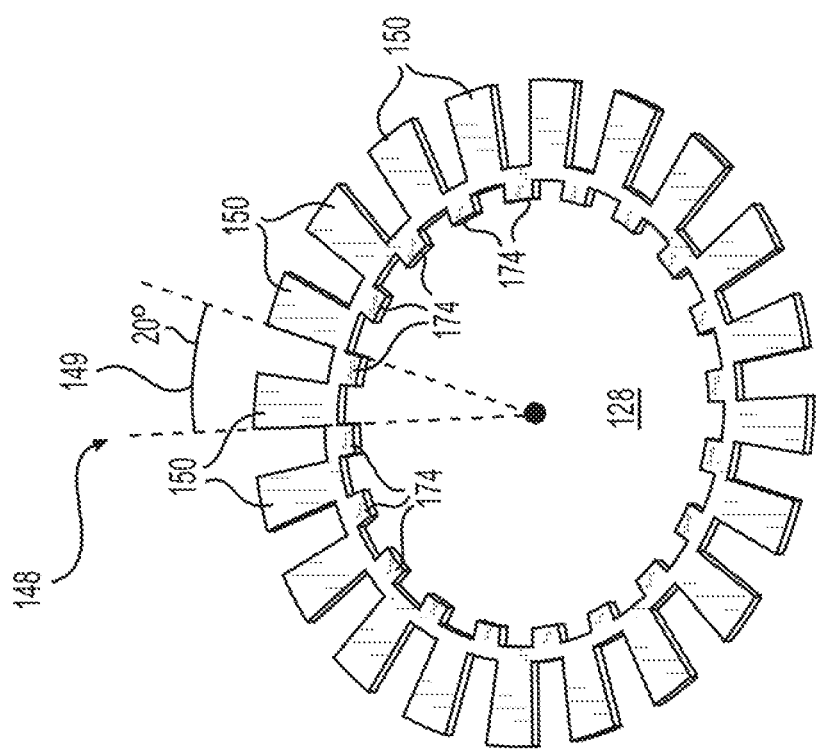
FIG. 9A is an isolated perspective view of an input target of the torque and angular sensor of the present disclosure.

FIG. 9B shows the input target 148 rotated from a first position to a second position and illustrates the first input rotation angle $\theta_{i1}$, which is equal to the second input rotation angle $\theta_{i2}$. The positions of the portion of the input target 149 that corresponds to the input rotation angles $\theta_{i1}$, $\theta_{i2}$, differ from the actual positions to simplify illustration. The actual positions may be different and may cause the respective input rotation angles $\theta_{i1}$, $\theta_{i2}$ to overlap one another. In practice, the structures associated with the first and second input rotation angles $\theta_{i1}$, $\theta_{i2}$ depend on the positions of the respective input coils $L_{181}$, $L_{182}$, $L_{183}$, $L_{184}$ and are preferably 45 degrees offset from one another.

In practice, the differential angle sensor 112 functions to measure the rotation angle of the input target 148 over an input angle range 149 with high precision and with two separate and independent measurements. The input angle range 149 depends on the number of input teeth 150 on the input target 148. As illustrated in the example embodiment shown in FIG. 9A, the input target 148 with eighteen input teeth 150 has an input angle range 149 of twenty degrees. The input angle range 149 is dependent upon the number of input teeth 150. The twenty-degree input angle range 149 of the example embodiment results from a 360 degree circle subdivided in eighteen equal portions, each corresponding to one of the input teeth 150.

The differential angle sensor 112 also functions to measure a rotation angle of the output target 164 over an output angle range 165 with high precision and with two separate and independent measurements. The output angle range 165 depends on the number of output teeth 166 on the output target 164. As illustrated in the example embodiment shown in FIG. 8A, the output target 164 with nine output teeth 166 has an output angle range 165 of 40 degrees. The output angle range 165 is dependent upon the number of output teeth 166. The forty-degree output angle range 165 of the example embodiment results from a 360 degree circle subdivided in nine equal portions, each corresponding to one of the output teeth 166.

Figure 11:
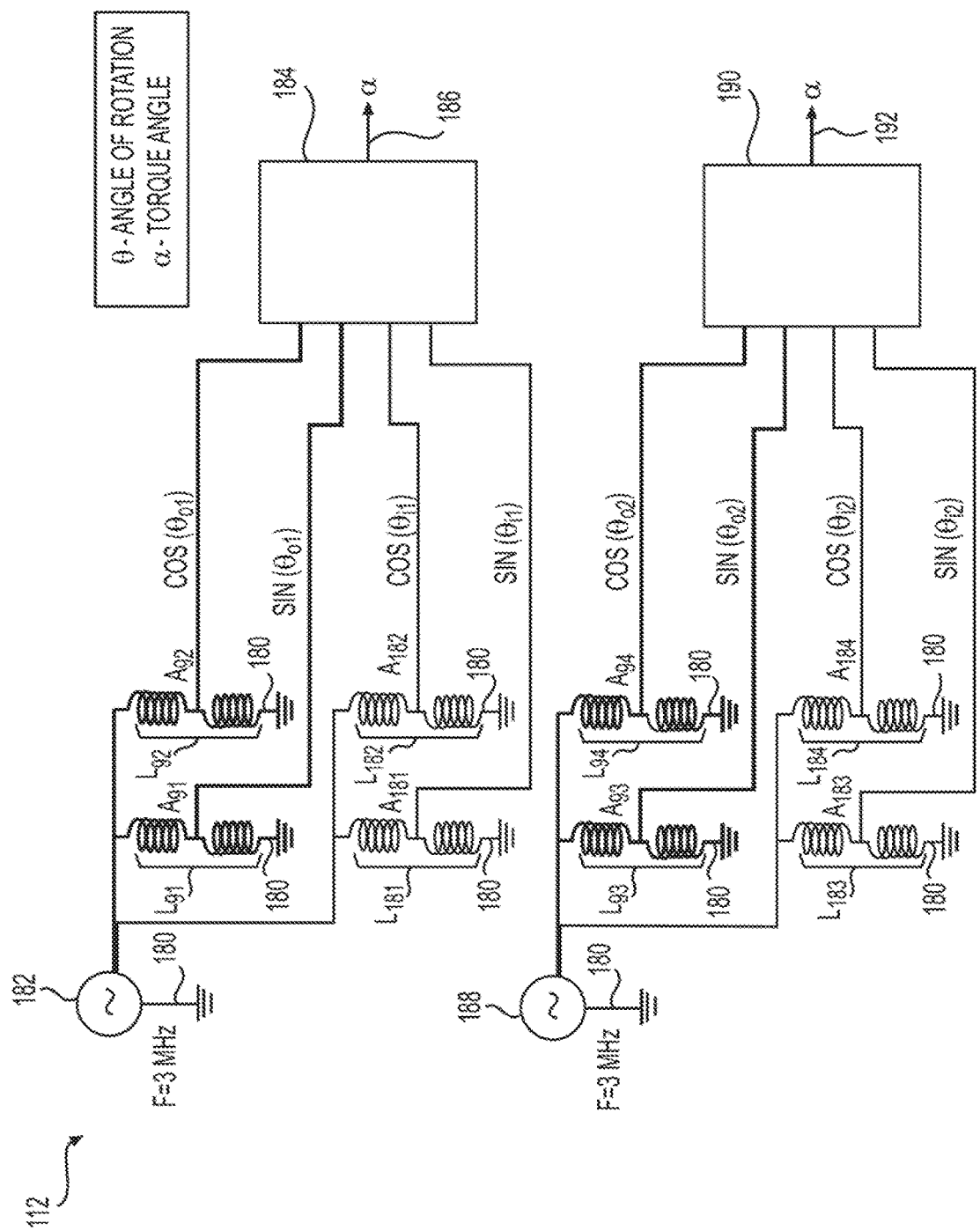
FIG. 11 is a schematic diagram of the torque and angular sensor of the present disclosure.

As shown in the schematic on FIG. 11, the differential angle sensor 112 includes the first output coil $L_{91}$ and the second output coil $L_{92}$ each being electrically connected between a common ground 180 and a first AC source 182 providing an AC voltage having a frequency of 3 MHz, and thereby generating an AC excitation current in each of the first output coil $L_{91}$ and the second output coil $L_{92}$. The first AC source 182 may have a different frequency that is greater than or less than 3 MHz.

The differential angle sensor 112 is configured to determine an output rotation angle, or a rotation angle of the output shaft 22, such as the first output rotation angle $\theta_{o1}$, using an electrical characteristic of at least one output coil $L_{91}$, $L_{92}$ located proximate to the output target 164. In the example embodiment illustrated in FIG. 11, the first output coil $L_{91}$ includes a first output tap $A_{91}$ having an AC voltage that varies with a first output rotation angle $\theta_{o1}$ of the output target 164 relative to the differential angle PCB 158 as sine $\theta_{o1}$. Similarly to the first output coil $L_{91}$, the second output coil $L_{92}$ includes a second output tap $A_{92}$ having a voltage varying with the first output rotation angle $\theta_{o1}$ of the output target 164 relative to the differential angle PCB 158 as cosine $\theta_{o1}$.

Each of the first output tap $A_{91}$ and the second output tap $A_{92}$ are in communication with a first processor 184, which is configured to determine the first output rotation angle $\theta_{o1}$ of the output target 164. The first and second output taps $A_{91}$, $A_{92}$ may, for example, be connected to analog inputs within or functionally connected to the first processor 184. The period of the sine and cosine signals of the first output rotation angle $\theta_{o1}$ corresponds to the output angle range 165, which depends on the number of output teeth 166 on the output target 164 as described above. In other words, by measuring the voltages of the first and second output taps $A_{91}$, $A_{92}$, the first processor 184 is able to determine the first output rotation angle $\theta_{o1}$, which is a rotational angle of the output target 164 within the output angle range 165, and with very high precision.

As also shown in the schematic on FIG. 11, the differential angle sensor 112 includes the first input coil $L_{181}$ and the second input coil $L_{182}$ each being electrically connected between the common ground 180 and the first AC source 182, which thereby generates an AC excitation current in each of the first input coil $L_{181}$ and the second input coil $L_{182}$.

The differential angle sensor 112 is also configured to determine an input rotation angle, or a rotation angle of the input shaft 20, such as the first input rotation angle $\theta_{i1}$, using an electrical characteristic of at least one input coil $L_{181}$, $L_{182}$ located proximate to the input target 148. In the example embodiment illustrated in FIG. 11, the first input coil $L_{181}$ includes a first input tap $A_{181}$ having a voltage that varies with a first input rotation angle $\theta_{i1}$ of the input target 148 relative to the differential angle PCB 158 as sine $\theta_{i1}$. Likewise, the second input coil $L_{182}$ includes a second input tap $A_{182}$ having a voltage that varies with the first input rotation angle $\theta_{i1}$ of the input target 148 relative to the differential angle PCB 158 as cosine $\theta_{i1}$.

Each of the first input tap $A_{181}$ and the second input tap $A_{182}$ are in communication with the first processor 184, which is configured to determine the first input rotation angle $\theta_{i1}$ of the input target 148. The first and second input taps $A_{181}$, $A_{182}$ may, for example, be connected to analog inputs within or functionally connected to the first processor 184. The period of the sine and cosine signals of the first input rotation angle $\theta_{i1}$ corresponds to the input angle range 149, which depends on the number of input teeth 150 on the input target 148 as described above. In other words, by measuring the voltages of the first and second input taps $A_{181}$, $A_{182}$, the first processor 184 is able to determine the first input rotation angle $\theta_{i1}$, which is a rotational angle of the input target 148 within the input angle range 149, and with very high precision.

The first processor 184 directly determines a torque angle $\alpha$ as the difference between the first output rotation angle $\theta_{o1}$ and the first input rotation angle $\theta_{i1}$, with the torque angle $\alpha$ corresponding to an amount of twist in the torsion beam 24 between the input shaft 20 and the output shaft 22. For example, a torque angle $\alpha$ which has a maximum value of ten degrees can be determined by the difference between the first output rotation angle $\theta_{o1}$ and the first input rotation angle $\theta_{i1}$, which have corresponding angle ranges 165, 149 of 40 degrees and 20 degrees, respectively. In other words, because the input angle range 149 and the output angle range 165 are each substantially larger than the maximum value of the torque angle $\alpha$, the torque angle $\alpha$ can be determined without need for a complete angular position of how the input shaft 20 or the output shaft 22 are oriented within the full angular range, which may be 360 degrees or larger. The full angular range may depend on the specific application of the torque and angular sensor 110. For example, where the torque and angular sensor are used to measure the torque angle $\alpha$ between shafts 20, 22 within a steering column of a production sedan, the range of travel corresponds to the lock-to-lock range of the steering column, which may be 3 full rotations, or 1080 degrees.

The first processor 184 includes a first output channel 186 for communicating the torque angle $\alpha$ to an external device, such as an electronic power steering controller or one or more other controllers.

As shown in the schematic on FIG. 11, the differential angle sensor 112 also includes the third output coil $L_{93}$ and the fourth output coil $L_{94}$ each being electrically connected between the common ground 180 and a second AC source 188, which provides an AC voltage having a frequency of 3 MHz, and thereby generating an AC excitation current in each of the third output coil $L_{93}$ and the fourth output coil $L_{94}$. The second AC source 188 may have a different frequency that is higher or lower than 3 MHz, and may be the same or a different frequency as the first AC source 182. The third output coil $L_{93}$ includes a third output tap $A_{93}$ having a voltage varying with a second output rotation angle $\theta_{o2}$ of the output target 164 relative to the differential angle PCB 158 as sine $\theta_{o2}$. Similarly to the third output coil $L_{93}$, the fourth output coil $L_{94}$ includes a fourth output tap $A_{94}$ having a voltage varying with the second output rotation angle $\theta_{o2}$ of the output target 164 relative to the differential angle PCB 158 as cosine $\theta_{o2}$.

In the example embodiment, the second output rotation angle $\theta_{o2}$ of the output target 164 is offset by a first fixed angle of 45 degrees from the first output rotation angle $\theta_{o1}$. However, the second output rotation angle $\theta_{o2}$ of the output target 164 may be offset from the first output rotation angle $\theta_{o1}$ by a different first fixed angle that is greater than or less than 45 degrees.

Each of the third output tap $A_{93}$ and the fourth output tap $A_{94}$ are in communication with a second processor 190, which is configured to determine the second output rotation angle $\theta_{o2}$ of the output target 164. The third and fourth output taps $A_{93}$, $A_{94}$ may, for example, be connected to analog inputs within or functionally connected to the second processor 190. The period of the sine and cosine signals of the second output rotation angle $\theta_{o2}$ corresponds to the output angle range 165, which depends on the number of output teeth 166 on the output target 164 as described above. In other words, by measuring the voltages of the third and fourth output taps $A_{93}$, $A_{94}$, the second processor 190 is able to determine the second output rotation angle $\theta_{o2}$, which is a rotational angle of the output target 164 within the output angle range 165, and with very high precision.

As also shown in the schematic on FIG. 11, the differential angle sensor 112 includes the third input coil $L_{183}$ and the fourth input coil $L_{184}$ each being electrically connected between the common ground 180 and the second AC source 188, which thereby generates an AC excitation current in each of the third input coil $L_{183}$ and the fourth input coil $L_{184}$. The third input coil $L_{183}$ includes a third input tap $A_{183}$ having a voltage varying with a second input rotation angle $\theta_{i2}$ of the input target 148 relative to the differential angle PCB 158 as sine $\theta_{i2}$. The fourth input coil $L_{184}$ includes a fourth input tap $A_{184}$ having a voltage varying with the second input rotation angle $\theta_{i2}$ of the input target 148 relative to the differential angle PCB 158 as cosine $\theta_{i2}$.

In the example embodiment, the second input rotation angle $\theta_{i2}$ of the input target 148 is offset by a second fixed angle of 45 degrees from the first input rotation angle $\theta_{i1}$. However, the second input rotation angle $\theta_{i2}$ of the input target 148 may be offset from the first input rotation angle $\theta_{i1}$ by a different second fixed angle that is greater than or less than 45 degrees.

Each of the third input tap $A_{183}$ and the fourth input tap $A_{184}$ are in communication with the second processor 190, which is configured to determine the second input rotation angle $\theta_{i2}$ of the output target 164. The third and fourth input taps $A_{183}$, $A_{184}$ may, for example, be connected to analog inputs within or functionally connected to the second processor 190. The period of the sine and cosine signals of the second input rotation angle $\theta_{i2}$ corresponds to the input angle range 149, which depends on the number of input teeth 150 on the input target 148 as described above. In other words, by measuring the voltages of the third and fourth input taps $A_{183}$, $A_{184}$, the second processor 190 is able to determine the second input rotation angle $\theta_{i2}$, which is a rotational angle of the input target 148 within the input angle range 149, and with very high precision.

The second processor 190 is configured to directly determine a torque angle $\alpha$ as the difference between the second output rotation angle $\theta_{o2}$ and the second input rotation angle $\theta_{i2}$, with the torque angle $\alpha$ corresponding to an amount of twist in the torsion beam 24 between the input shaft 20 and the output shaft 22. The second processor 190 includes a second output channel 192 for communicating the torque angle α to an external device, such as an electronic power steering controller or one or more other controllers.

Because the subject differential angle sensor 112 measures each of the input and output and output rotation angles $\theta_{i1}$, $\theta_{o1}$, $\theta_{i2}$, $\theta_{o2}$ relative to the differential angle PCB 158, which is fixed to the enclosure 120, and which is therefore fixed to the body of the vehicle, the torque and angular sensor 110 is able to determine the source of any change to the torque angle α. In other words, the torque angle sensor 110 of the present disclosure may be configured to determine whether rotation of a specific one of the input shaft 20 or the output shaft 22 is a primary source of torque applied to the torsion beam 24. A steering system using the subject differential angle sensor 112 may provide different control actions depending on the source of a change in torque angle α. For example, such a steering system may provide one first control output to an actuator in one case where a change in torque angle α is caused by a user turning the steering wheel, which is connected to the input shaft 20. The steering system may provide a second, different, control output in another case where the vehicle wheels cause the output shaft 22 to rotate for example, by driving the vehicle on a sideways sloped surface, such as the crown of a road. This may allow a system to correct for a lead-pull type situation in which a driver would otherwise need to supply a control input, such as a turning force on the steering wheel, to drive in a straight line in order to compensate for a pull caused by driving on a sloped surface.

The first processor 184 and the second processor 190 may each independently calculate and communicate the torque angle α based upon different data from different ones of the input coils $L_{181}$, $L_{182}$, $L_{183}$ $L_{184}$ and from different ones of the output coils $L_{91}$, $L_{92}$, $L_{93}$ $L_{94}$, with the different ones of the input coils $L_{181}$, $L_{182}$, $L_{183}$ $L_{184}$ and the output coils $L_{91}$, $L_{92}$, $L_{93}$ $L_{94}$ being energized by different ones of the AC sources 182, 188. In this way, the processors 184, 190 may operate independently are each configured to provide a first level of redundancy in case of a malfunction associated with the other one of the processors. For example, the first processor 184 may continue to operate in place of the second processor 190 in case of a malfunction with the second processor 190 or any of its associated input coils $L_{183}$ $L_{184}$, output coils $L_{93}$ $L_{94}$, AC source 188, or with any wiring or other circuitry required for operation of the second processor 190. The second processor 190 may likewise serve as a redundant backup in case of a malfunction associated with the first processor 184.

Each of the output taps $A_{91}$, $A_{92}$, $A_{93}$, $A_{94}$ of the example embodiment is located at a center point an equal number of turns between each end of the corresponding output coil $L_{91}$, $L_{92}$, $L_{93}$ $L_{94}$. However, any or all of the output taps $A_{91}$, $A_{92}$, $A_{93}$, $A_{94}$ may be connected to one or more other points along the corresponding output coil $L_{91}$, $L_{92}$, $L_{93}$ $L_{94}$. Likewise, each of the input taps $A_{181}$, $A_{182}$, $A_{183}$, $A_{184}$ of the example embodiment is located at a center point an equal number of turns between each end of the corresponding input coil $L_{181}$, $L_{182}$, $L_{183}$ $L_{184}$. However, any or all of the input taps $A_{181}$, $A_{182}$, $A_{183}$, $A_{184}$ may be connected to one or more other points along the corresponding input coil $L_{181}$, $L_{182}$, $L_{183}$ $L_{184}$.

Figure 12:
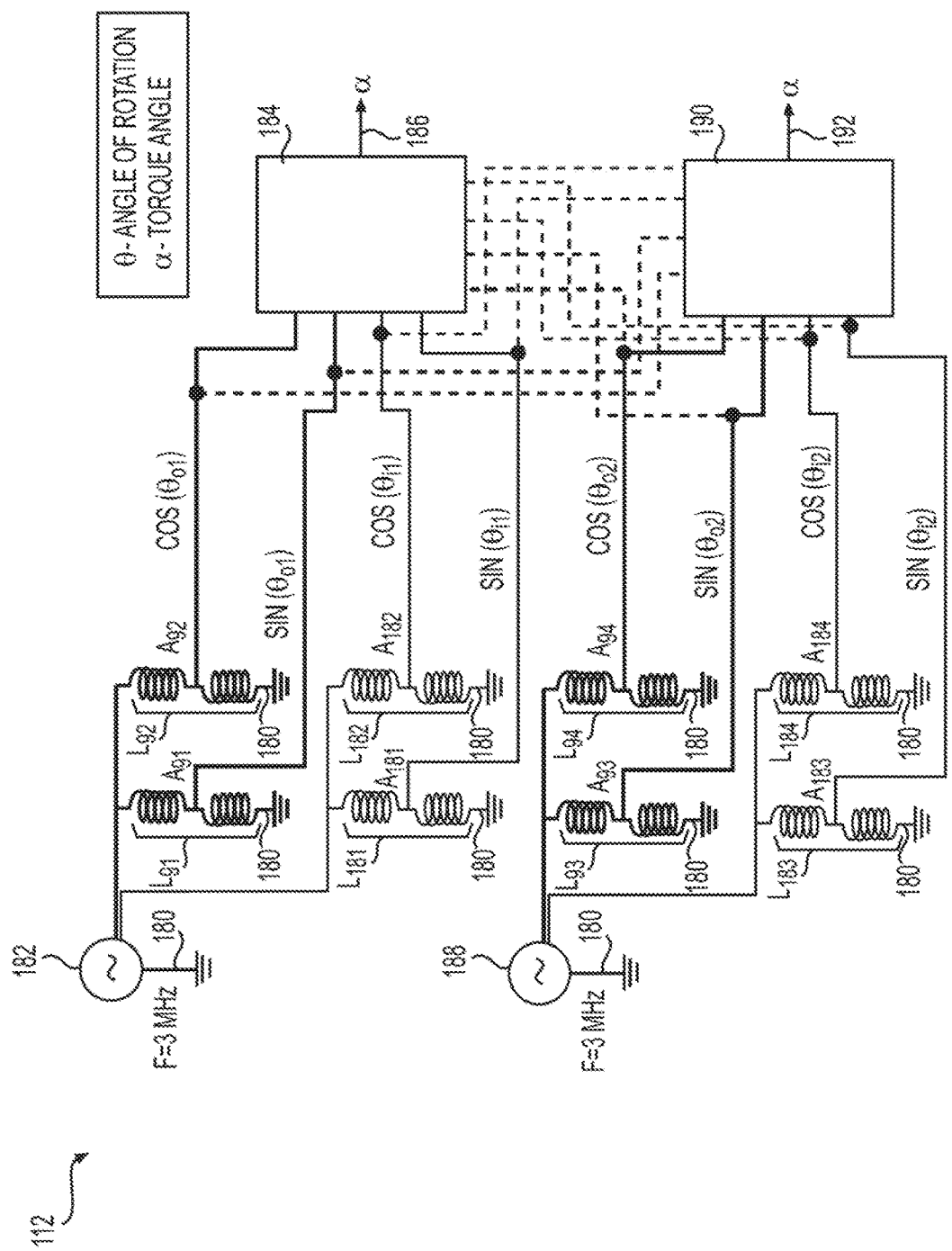
FIG. 12 is an alternative schematic diagram of the torque and angular sensor of the present disclosure.

As shown in FIG. 12, each of the first processor 184 and the second processor 190 may be configured to monitor the voltages of all of the input taps $A_{181}$, $A_{182}$, $A_{183}$, $A_{184}$ and all of the output taps $A_{91}$, $A_{92}$, $A_{93}$, $A_{94}$. This allows the subject differential angle sensor 112 to provide a second level of redundancy, allowing the torque angle α to be determined and reported even in cases where one of the processors 184, 190 malfunctions and where one or more of the input coils $L_{181}$, $L_{182}$, $L_{183}$ $L_{184}$ or the output coils $L_{91}$, $L_{92}$, $L_{93}$ $L_{94}$, or the AC sources 182, 188 also malfunctions.

Figure 15:
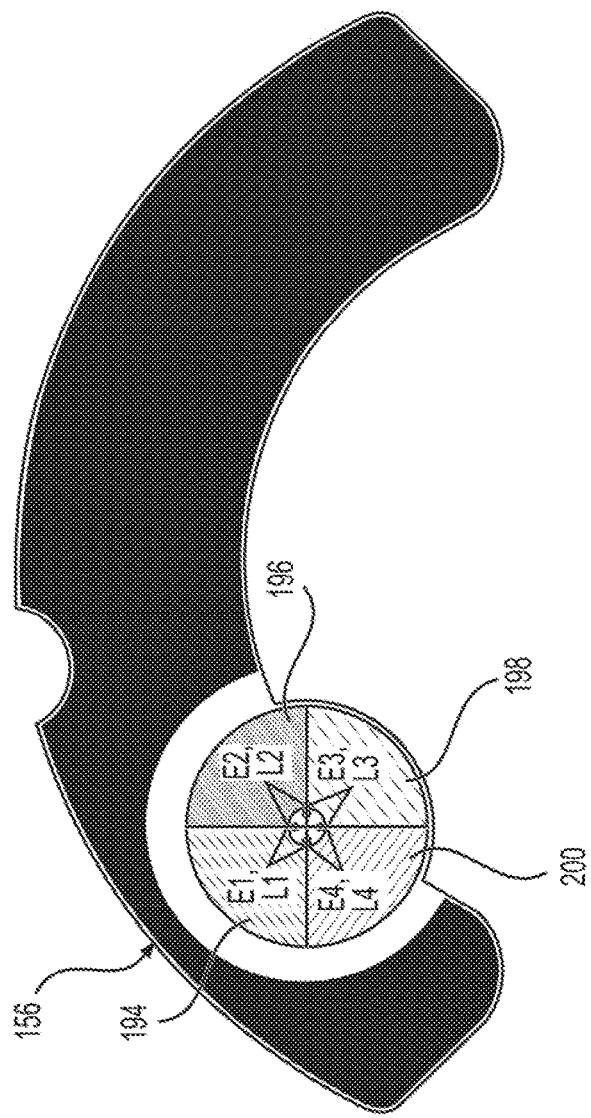
FIG. 15 is an example layout for an angular position PCB of the torque and angular sensor of the present disclosure.

As shown in FIG. 15, the angular position PCB 156 may include a first inductor L1 as a coil in a first segment 194 having a wedge shape with a 90 degree angle. The angular position PCB 156 also includes a second inductor L2 as a coil in a second segment 196 having a wedge shape with a 90 degree angle. The angular position PCB 156 also includes a third inductor L3 as a coil in a third segment 198 having a wedge shape with a 90 degree angle. The angular position PCB 156 also includes a fourth inductor L3 as a coil in a fourth segment 200 having a wedge shape with a 90 degree angle. As the input rotor assembly 142 rotates with the input shaft 20, the first gear 130 rotates, causing the second gear 132 to also rotate. This causes a 180 degree segment copper target, located within the cylindrical portion 170 (not shown) to also rotate which causes, due to eddy current effects, inductance change in the four inductors L1, L2, L3, L4 of the angular position PCB 156 shown in FIG. 15. The inductance of each of those four inductors L1, L2, L3, L4 may then be used to determine the input shaft rotation angle region $\theta_{i\text{-}reg}$ of the input shaft 20. Each of the segments 194, 196, 198, 200 of the angular position PCB 156 includes a corresponding excitation coil E1, E2, E3, E4 disposed parallel and over or under a corresponding one of the inductors L1, L2, L3, L4.

Figure 16:
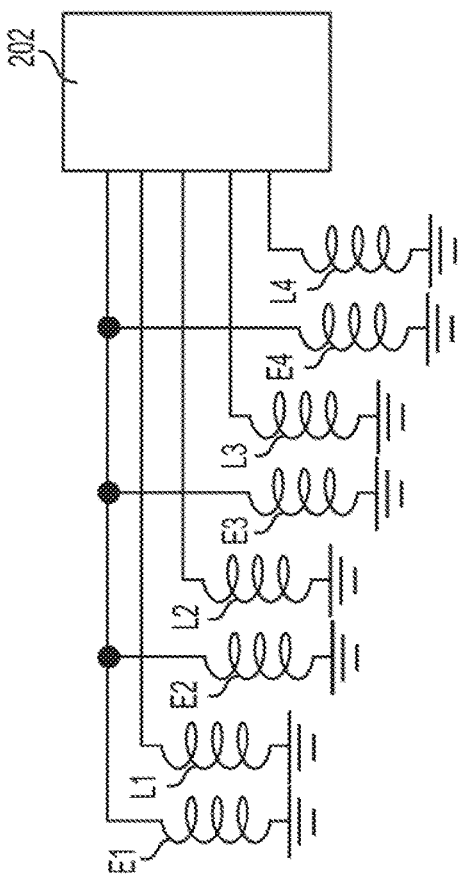
FIG. 16 is a schematic diagram of a circuit for an angular position sensor.
Figure 18:
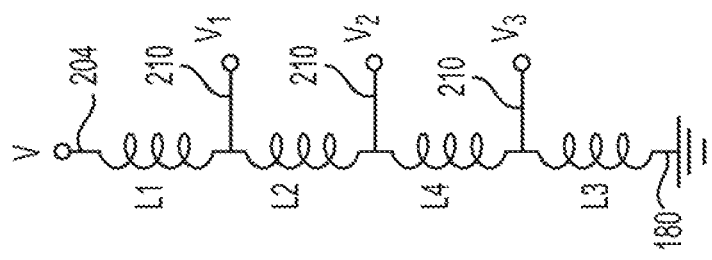
FIG. 18 is a schematic diagram of another alternative embodiment circuit for an angular position sensor.
Figure 17:
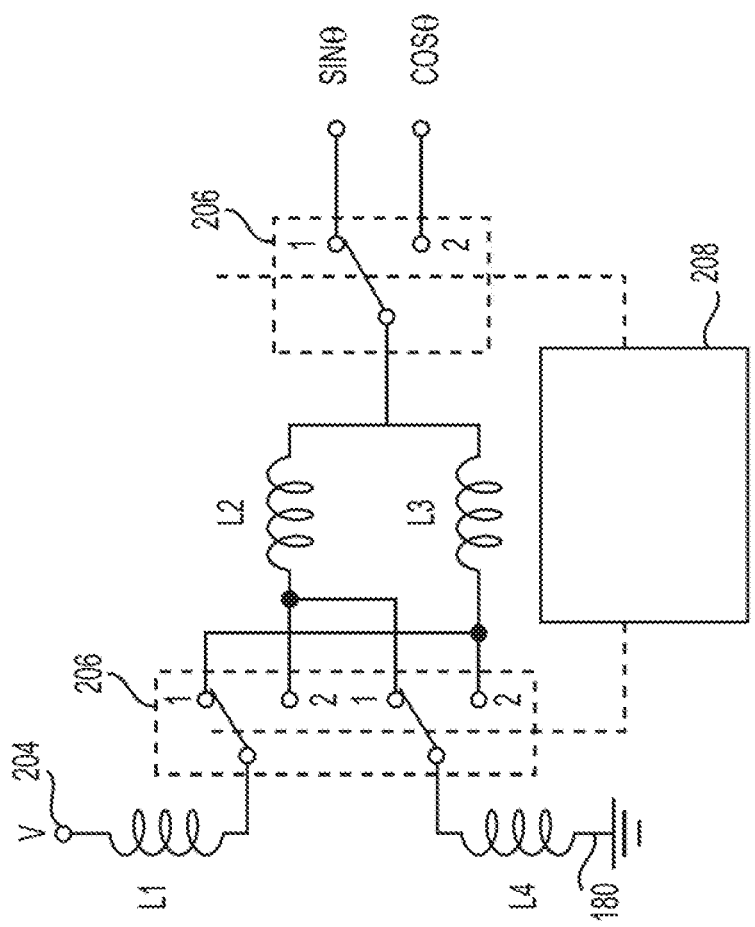
FIG. 17 is a schematic diagram of an alternative embodiment circuit for an angular position sensor.

FIGS. 16-18 illustrate three circuit implementations capable of employing eddy currents to detect the angular position of the input shaft 20. In the embodiment of FIG. 16, each of four inductors L1, L2, L3, L4 have one end grounded and another end connected to an angular position controller 202, which is configured to supply an AC excitation voltage to each of the excitation coils E1, E2, E3, E4 and to monitor the inductance of each of the four inductors L1, L2, L3, L4 and to generate a digital signal based upon those inductances, which can be used by a controller to determine the angular position of the input shaft 20.

In the embodiment of FIG. 17, the first inductor L1 includes an end node 204 connected to a voltage supply, and a fourth inductor L4 has an end connected to the common ground 180. Connections between each of the four inductors L1, L2, L3, L4 are switched by switches 206, which may be controlled by a switching controller 208, such as a multiplexer integrated circuit. By switching the connections between each of the four inductors L1, L2, L3, L4, sine and cosine values can be determined, allowing the input shaft rotation angle region $\theta_{i\text{-}reg}$ to be determined. In the embodiment of FIG. 18, the four inductors L1, L2, L3, L4 are connected in series between an end note 204 connected to a voltage supply and the common ground 180. Intermediate voltages V1, V2, V3 on intermediate nodes 210 between adjacently connected ones of the four inductors L1, L2, L3, L4 are measured and used to determine the input shaft rotation angle region $\theta_{i\text{-}reg}$.

Figure 19:
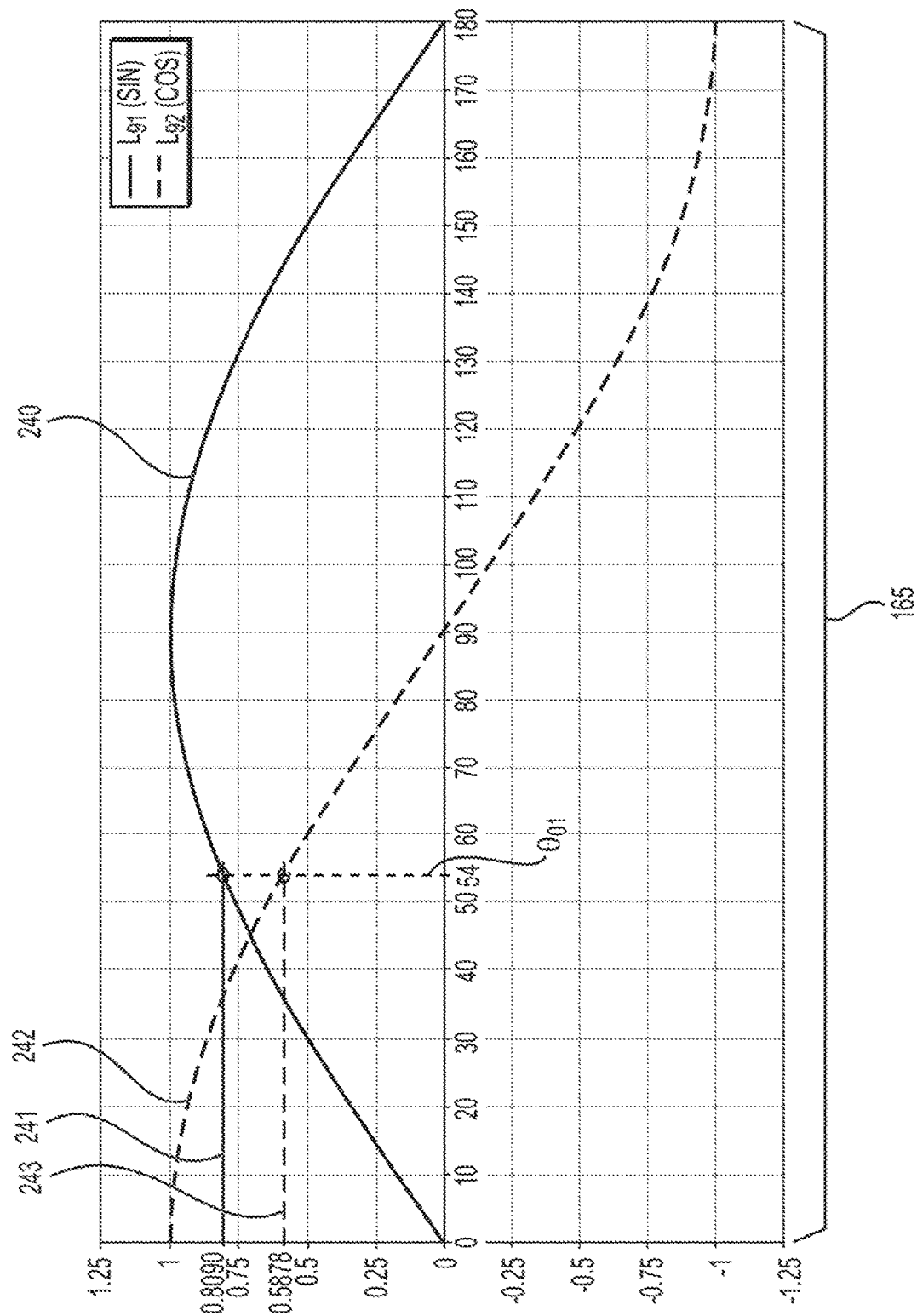
FIG. 19 is a graph showing voltages of two output coils as sine and cosine of an angular position.

FIG. 19 shows a graph of a first output coil reference 240 and a second output coil reference 242 over the output angle range 165. Each of the output coil references 240, 242 are known functions that relate the voltages on the output taps $A_{91}$, $A_{92}$ with a corresponding one of the output rotation angles $\theta_{o1}$, $\theta_{o2}$ of the output target 164. The output coil references 240, 242 may be preset or recorded as part of a calibration process, which may be performed at the factory when the torque and angular sensor 110 is assembled. The first output coil reference 240 varies sinusoidally with the rotation angle of the output target 164 as sine $\theta_{o1}$. The second output coil reference 242 varies sinusoidally with the rotation angle of the output target 164 as cosine $\theta_{o1}$. The first processor 184 is configured to determine a first scaled output coil value 241 by applying a scaling factor to the voltage of the first output tap $A_{91}$. The first processor 184 is configured to determine a second scaled output coil value 243 by applying a scaling factor to the voltage of the second output tap $A_{92}$. As illustrated by the dashed lines, the first processor 184 is configured to determine the first output rotation angle $\theta_{o1}$ of the output target 164 over the output angle range 165 by correlating each of the first scaled output coil value 241 and the second scaled output coil value 243. In determining the first output rotation angle $\theta_{o1}$, the first processor 184 may employ computation methods or one or more other methods such as a lookup table. For example, with reference to the values shown in FIG. 19, with a first scaled output coil value 241 of 0.8090, and with a second scaled output coil value 243 of 0.5878, the first processor 184 may calculate the first output rotation angle $\theta_{o1}$ as arctangent (0.08090/0.05878), or 54 degrees. In other words, an output rotation angle $\theta_{o1}$ of the output target 164 is computed by dividing the measured values of sine and cosine to obtain a corresponding tangent value, then employing the arctangent function. For the input target 148, an input rotation angle $\theta_{i1}$ is computed similarly employing the arctangent function.

Figure 14:
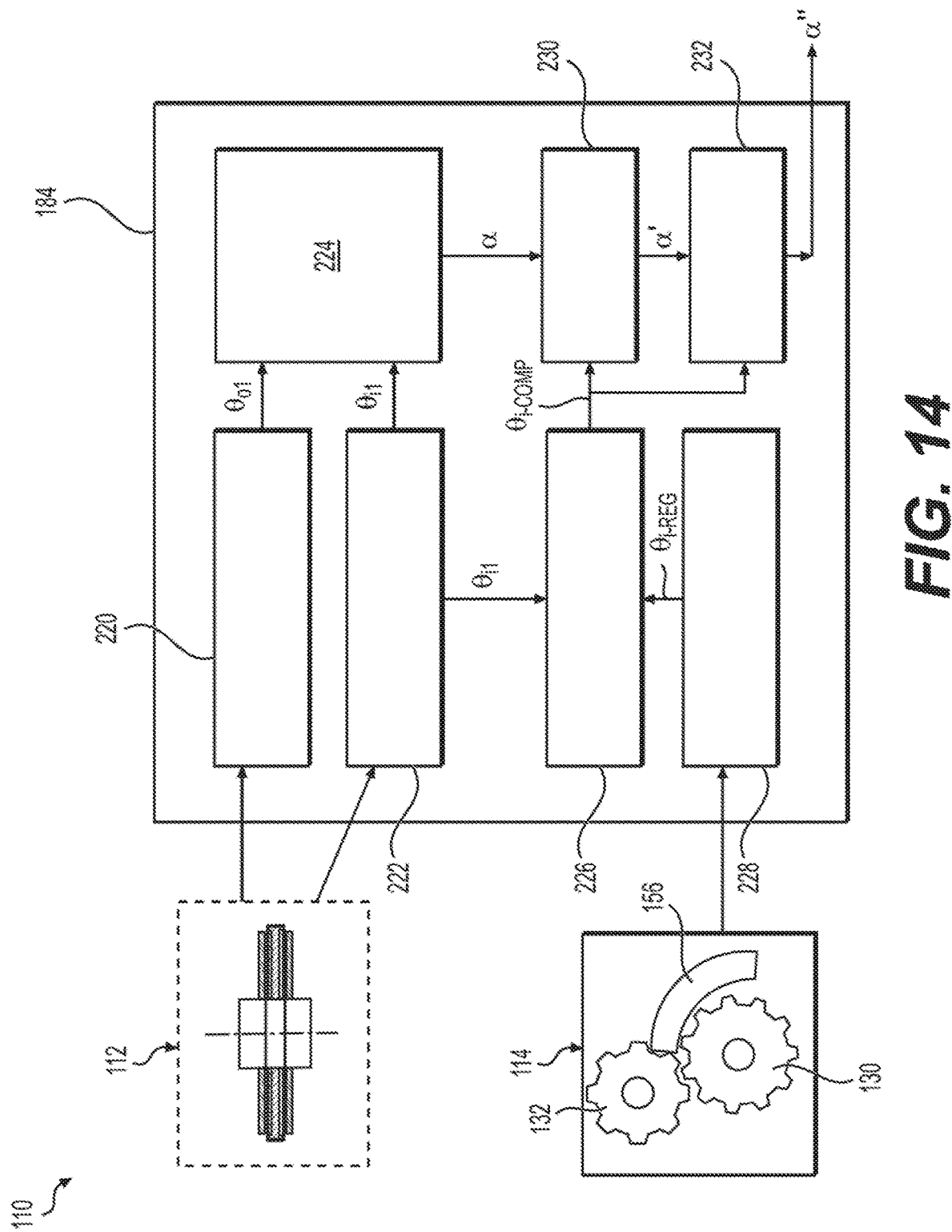
FIG. 14 is a block diagram illustrating aspects of the torque and angular sensor of the present disclosure.

FIG. 14 is a block diagram showing the operation of various parts of the example torque and angular sensor 110 provided in the present disclosure. The torque and angular sensor 110 includes the hardware components of the differential angle sensor 112 detailed in FIG. 7, which are in communication with an output shaft position calculator 220 configured to determine the first output rotation angle $\theta_{o1}$ of the output shaft 22 with high precision and over the output angle range 165, which is 40 degrees in the example embodiment provided. Likewise, the hardware components of the differential angle sensor 112 are in communication with an input shaft position calculator 222 configured to determine the first input rotation angle $\theta_{i1}$ of the input shaft 20 with high precision and over the input angle range 149, which is 20 degrees in the example embodiment provided. The first output rotation angle $\theta_{o1}$ and the first input rotation angle $\theta_{i1}$ are each communicated to a torque angle calculator 224, which determines a raw torque angle $\alpha$ as the difference between the first output rotation angle $\theta_{o1}$ and the first input rotation angle $\theta_{i1}$.

As shown in FIG. 14, each of the output shaft position calculator 220, and the input shaft position calculator 222 and the torque angle calculator 224 are provided as software components stored in non-transitory memory and executed by the first processor 184. However, any or all of those calculators 220, 222, 224 may be provided as hardware or software components which may be embodied in one or more general purpose computer processors or special purpose devices such as an ASIC or field programmable gate array (FPGA). The initial rotational and linear compensation takes place at the "end-of-line" calibration before the torque and angular sensor 110 leaves the factory. A custom calibration device employs its own precision angular sensor to acquire, at preset nominal, one or more torque angles, a table of torque values over a full 360 degree input shaft rotation for both processors 184, 190. The data is used to generate operating parameters for compensation algorithms or lookup tables for use by each the compensators 230, 232 in each of the processors 184, 190.

An input shaft region calculator 228 is in communication with hardware components of the angular position sensor 114, such as the angular position PCB 156 and is configured to determine the input shaft rotation angle region $\theta_{i\text{-}reg}$, or the angular position of the input shaft 20 throughout its full angular range, which may be 360 degrees or larger. The input shaft rotation angle region $\theta_{i\text{-}reg}$ may, therefore, be much less precise than the first input rotation angle $\theta_{i1}$ as determined by the input shaft position calculator 222. A composite input shaft position calculator 226 combines the input shaft rotation angle region $\theta_{i\text{-}reg}$ from the input shaft region calculator 228 with the first input rotation angle $\theta_{i1}$ from the input shaft position calculator 222 to generate a input shaft rotation angle composite $\theta_{i\text{-}comp}$, which has the high precision of the first input rotation angle $\theta_{i1}$ and also specifies the angular position of the input shaft 20 anywhere within its entire full angular range. Each of the input shaft region calculator 228 and the composite input shaft position calculator 226 are provided as software components stored in non-transitory memory and executed by the first processor 184. However, either or both of those calculators 226, 228 may be provided as hardware or software components which may be embodied in one or more general purpose computer processors or special purpose devices such as an ASIC or field programmable gate array (FPGA).

As also shown in FIG. 14, the torque and angular sensor 110 of the present disclosure also includes a rotational compensator 230 that modifies the raw torque angle $\alpha$ from the torque angle calculator 224 to generate a rotationally-compensated torque angle $\alpha'$. The operation of the rotational compensator 230 is described below in this description with reference to FIGS. 22-23. Similarly, a linear compensator 232 that modifies the rotationally-compensated torque angle $\alpha'$ from the rotational compensator 230 to generate a high-precision torque angle $\alpha''$. The operation of the linear compensator 232 is described below in this description with reference to FIGS. 24-25. Each of the rotational compensator 230 and the composite input shaft position calculator 226 are provided as software components stored in non-transitory memory and executed by the first processor 184. However, either or both of those compensators 230, 232 may be provided as hardware or software components which may be embodied in one or more general purpose computer processors or special purpose devices such as an ASIC or field programmable gate array (FPGA).

Figure 20:
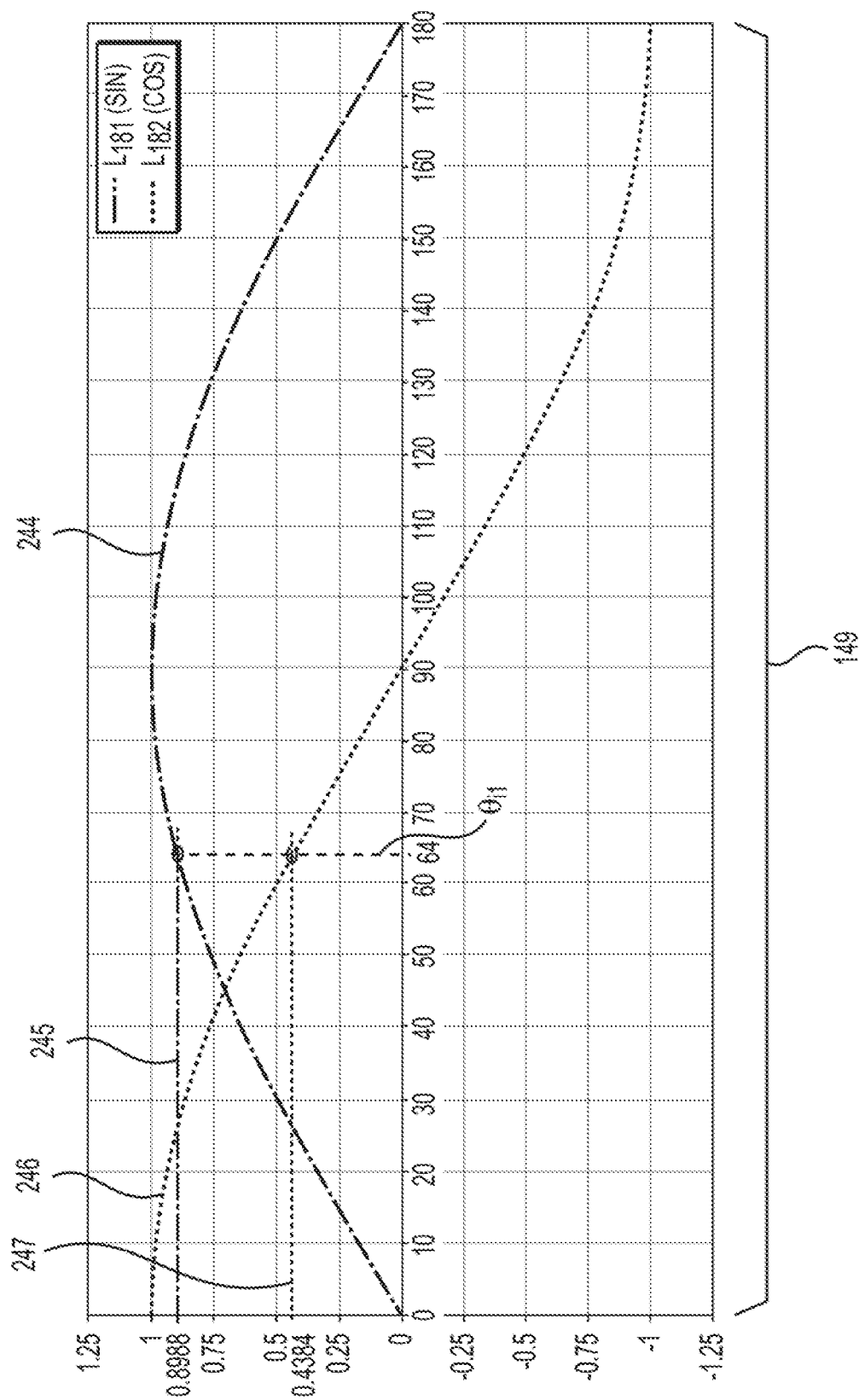
FIG. 20 is a graph showing voltages of two input coils representing sine and cosine of an angular position.

FIG. 20 shows a graph of a first input coil reference 244 and a second input coil reference 246 over the input angle range 149. Each of the input coil references 244, 246 are known functions that relate the voltages on the input taps $A_{181}$, $A_{182}$ with a corresponding one of the input rotation angles $\theta_{i1}$, $\theta_{i2}$ of the input target 148. The input coil references 244, 246 may be preset or recorded as part of a calibration process, which may be performed at the factory when the torque and angular sensor 110 is assembled. The first input coil reference 244 varies sinusoidally with the rotation angle of the input target 148 as sine $\theta_{i1}$. The second scaled input coil reference 246 varies sinusoidally with the rotation angle of the input target 148 as cosine $\theta_{i1}$. The first processor 184 is configured to determine a first scaled input coil value 245 by applying a scaling factor to the voltage of the first input tap $A_{181}$. The first processor 184 is configured to determine a second scaled input coil value 247 by applying a scaling factor to the voltage of the second input tap $A_{182}$. As illustrated by the dashed lines, the first processor 184 is configured to determine the first input rotation angle $\theta_{i1}$ of the input target 148 over the input angle range 149 by correlating each of the first scaled input coil value 245 and the second scaled input coil voltage 247. In determining the first input rotation angle $\theta_{i1}$, the first processor 184 may employ computation methods or other methods, such as a lookup table. For example, with reference to the values shown in FIG. 20, with a first scaled input coil value 245 of 0.8988, and with a second scaled input coil value 247 of 0.4384, the first processor 184 may calculate the first input rotation angle $\theta_{i1}$ as arctangent (0.898/0.4384), or 64 degrees.

If the first processor 184 detects a failure with any one of its four associated coils $L_{181}$, $L_{182}$, $L_{91}$, $L_{92}$, then the first processor 184 will proceed with a backup procedure to compute the torque angle $\alpha$ using the three remaining associated coils $L_{181}$, $L_{182}$, $L_{91}$, $L_{92}$. Likewise, if the second processor 190 detects a failure with any one of its four associated coils $L_{183}$, $L_{184}$, $L_{93}$, $L_{94}$, then the second processor 190 will proceed with a backup procedure to compute the torque angle $\alpha$ using the three remaining associated coils $L_{183}$, $L_{184}$, $L_{93}$, $L_{94}$. Either processor 184, 190, may detect a failed coil as one having a value that is outside of an expected range. This arrangement allows the torque and angular sensor 110 of the present disclosure to provide a third layer of redundancy.

Figure 21:
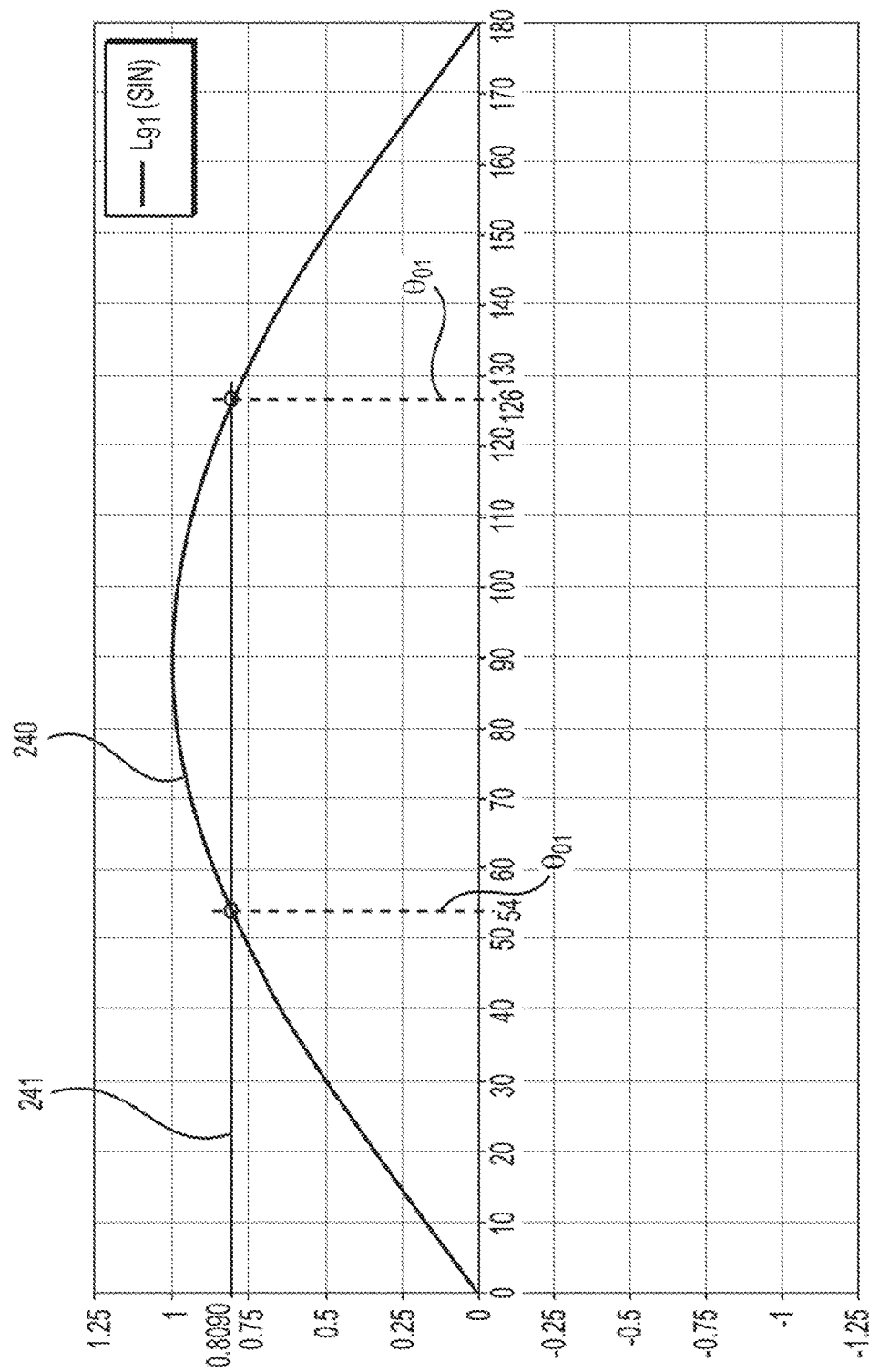
FIG. 21 is a graph showing voltages of a single output coil as the sine of an angular position.

With reference to FIG. 21, the first processor 184 is configured to determine a first output rotation angle $\theta_{i1}$ from one of two possible first output rotation angles $\theta_{i1}$ using a single a scaled first outlet position value. More generally, the first processor 184 is configured to determine the first output rotation angle $\theta_{o1}$, and the first input rotation angle $\theta_{i1}$, using any three of the four associated coils $L_{181}$, $L_{182}$, $L_{91}$, $L_{92}$. Likewise, the second processor 190 is configured to determine the second output rotation angle $\theta_{o2}$, and the second input rotation angle $\theta_{i2}$, using any three of the four associated coils $L_{183}$, $L_{184}$, $L_{93}$, $L_{94}$. As illustrated on FIG. 21, using only the first scaled output coil value 241, and without the second scaled output coil value 242, the first processor 184 may determine two different possible first output rotation angles $\theta_{o1}$ where the output target 164 may be located within the output angle range 165. For example, the first processor 184 may calculate the arcsine of the first scaled output coil value 241 of 0.8090 to determine that the first output rotation angle $\theta_{o1}$ is either 54 degrees or 126 degrees. With knowledge of the first input rotation angle $\theta_{o1}$, one of the possible first output rotation angles $\theta_{o1}$ may be eliminated as not being possible due to the limits of the torque angle $\alpha$ which has a maximum value of 10 degrees. In practice, the first processor 184 may simply use the one of the two different possible output rotation angles $\theta_{o1}$ that is closest to the known input rotation angle $\theta_{o1}$. The first processor 184 may be configured to operate similarly where only one of the scaled input coil values 244, 246 can be determined, but where both of the scaled output coil values 241, 243 are known. In the example case, the first output rotation angle $\theta_{o1}$ is determined to be 54 degrees as that is the one of the two different possible first output rotation angles $\theta_{o1}$ closest to the known first input rotation angle $\theta_{i1}$ of 64 degrees.

The torque and angular sensor 110 provided in the present disclosure also includes an angular position sensor 114 configured to determine an angular position of the input shaft 20 over a full angular range that is substantially larger than each of the output angle range and the input angle range. The angular position sensor 114 may therefore provide the input angular position as an input shaft rotation angle region $\theta_{i\text{-}reg}$, having less precision, but over a larger range than the input rotation angles $\theta_{i1}$, $\theta_{i2}$, determined by the differential angle sensor 112.

Figure 22:
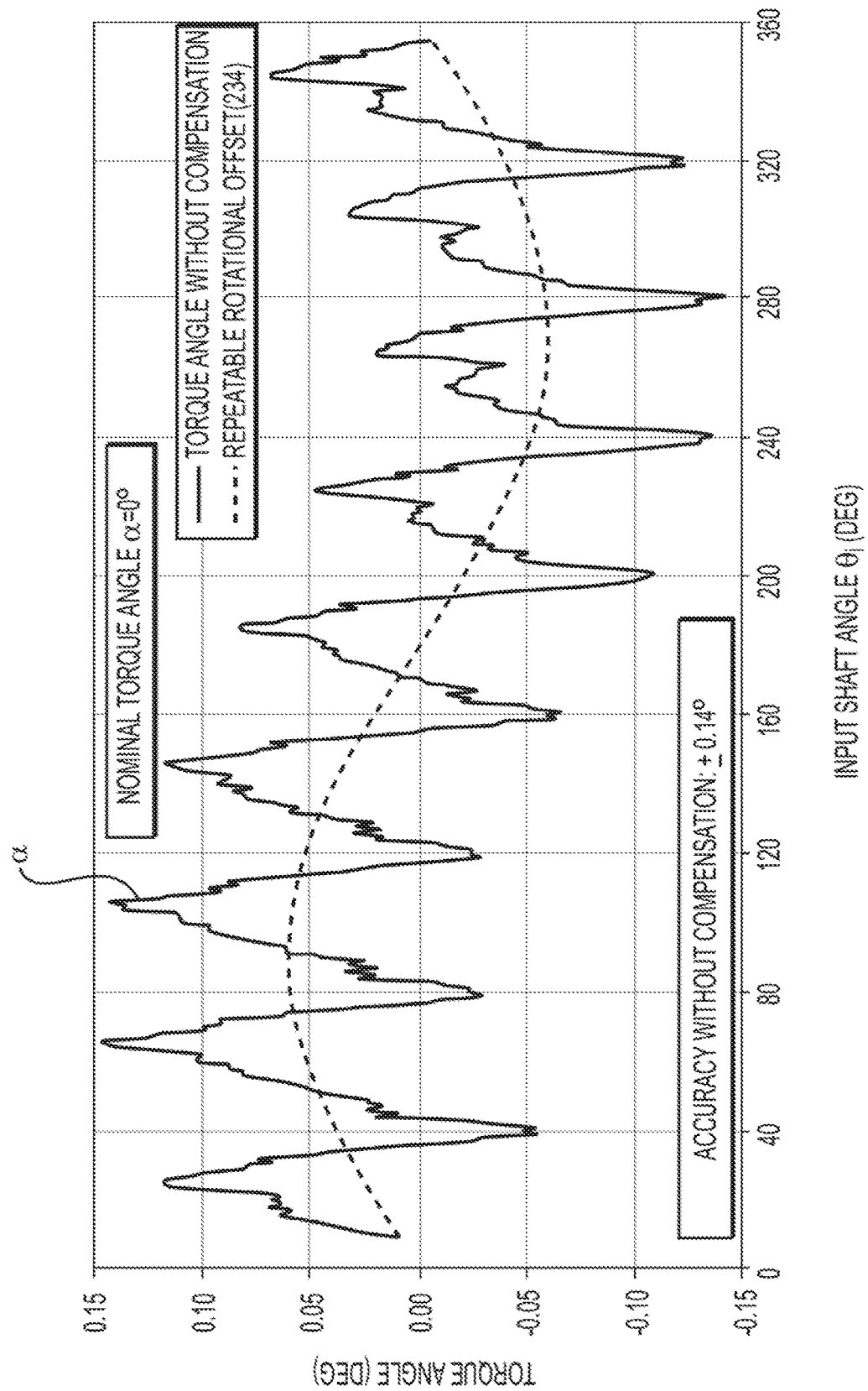
FIG. 22 is a graph of torque angle as a function of input shaft angle and without any compensation, and with a periodic rotational offset as a function of input shaft angle.

With reference to FIG. 22, the raw torque angle $\alpha$ coming from the torque angle calculator 224 has a rotational offset component 234 which varies periodically with the input shaft angle to compensate for a first systemic error which is consistent and repeatable. More specifically, the rotational offset component 234 illustrated in FIG. 22 is sinusoidal. That repeatable rotational offset component 234 is subtracted from the raw torque angle $\alpha$ by the rotational compensator 230 generate a rotationally-compensated torque angle $\alpha'$ as described above. As noted on FIG. 22, the torque angle $\alpha$ has a nominal value of 0 degrees across the 360 degree range of input shaft angles $\theta_i$. FIG. 22 illustrates an accuracy of +/−0.14 degrees for the raw torque angle $\alpha$.

Figure 23:
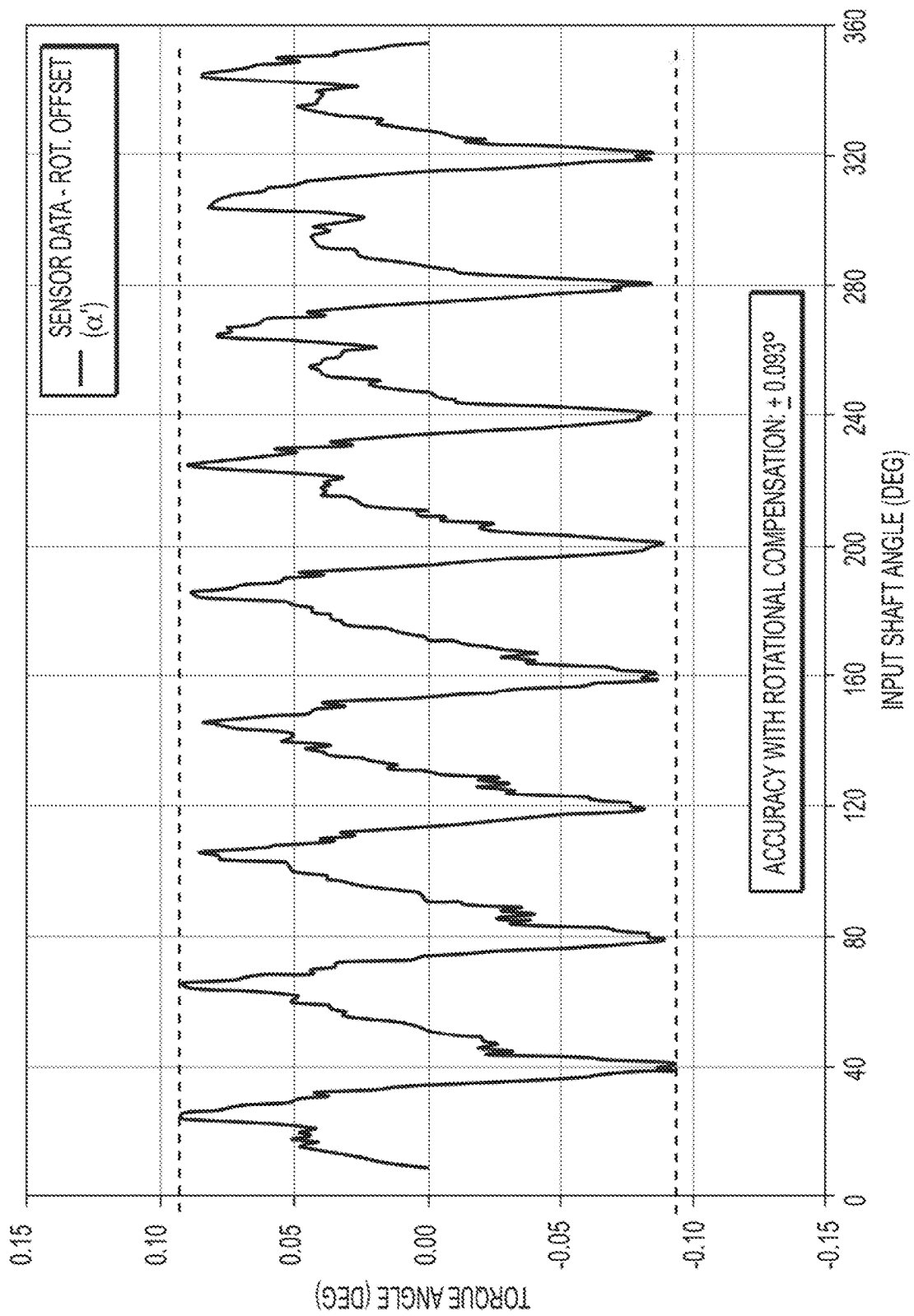
FIG. 23 is a graph of torque angle as a function of input shaft angle and with rotational compensation.

Contrasting the raw torque angle $\alpha$ shown in the graph of FIG. 22 with the rotationally-compensated torque angle $\alpha'$ shown in the graph of FIG. 23 illustrates the improvement in accuracy from +/−0.14 degrees of the raw torque angle $\alpha$ to +/−0.093 degrees of the rotationally-compensated torque angle $\alpha'$.

Figure 24:
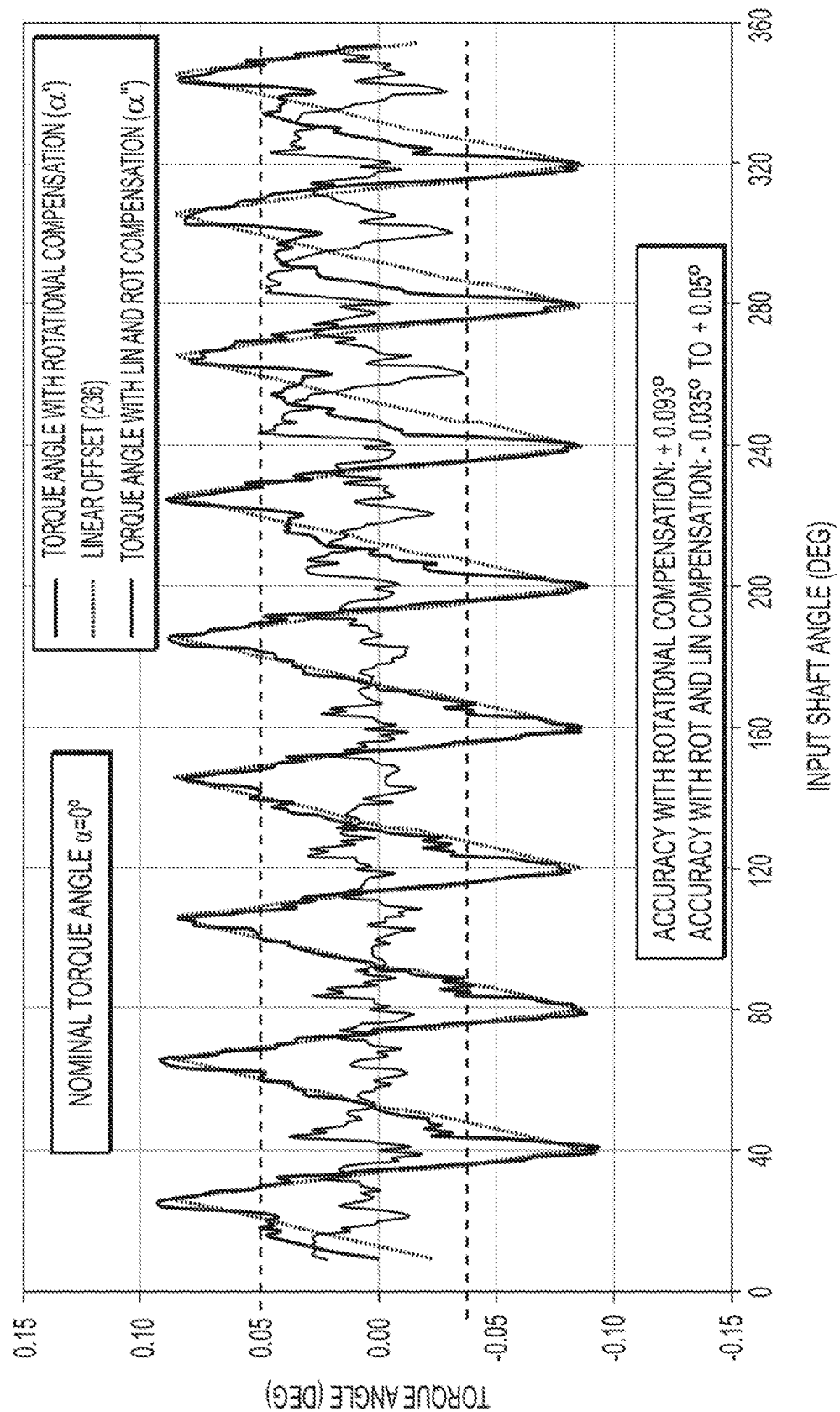
FIG. 24 is a graph of torque angle as a function of input shaft angle with rotational compensation, and with a linear offset as a function of shaft angle, and with the torque angle as a function of input shaft angle with both rotational and linear compensation.

With reference to FIG. 24, the rotationally-compensated torque angle $\alpha'$ has a linear offset component 236 which varies linearly and proportionally with the input shaft angle and which is consistent and repeatable. The linear offset component 236 has a sawtooth shape with a period of 40 degrees and compensates for a second systemic error that is constant and repeatable and which results from the use of the arctangent function to determine the input and output shaft angles $\theta_i$, $\theta_o$. The repeatable linear offset component 236 is subtracted from the rotationally-compensated torque angle $\alpha'$ by the linear compensator 232 generate the high-precision torque angle $\alpha''$ as described above in the description of FIG. 14. Contrasting the rotationally-compensated torque angle $\alpha'$ with the high-precision torque angle $\alpha''$ illustrates the improvement in accuracy from 0.093 degrees of the rotationally-compensated torque angle $\alpha'$ to the −0.035 to +0.05 degrees of the high-precision torque angle $\alpha''$. As noted on FIG. 24, the torque angle $\alpha$ has a nominal value of 0 degrees across the 360 degree range of input shaft angles $\theta_i$.

FIG. 25 overlays the raw torque angle $\alpha$, which is similar to torque angle outputs of existing sensors, with the high-precision torque angle $\alpha''$ generated by the torque and angular sensor 110 of the present disclosure. The rotational offset component 234 shown in FIG. 25 varies periodically with the input shaft angle and is parabolic. In other words, FIG. 25 presents data obtained from another sample sensor which displays similar linear offset, but distinctly different rotational offset from the sensor sample in FIG. 22. As noted on FIG. 25, the torque angle $\alpha$ has a median value of 1.932 degrees across the 360 degree range of input shaft angles $\theta_i$.

As described in the flow charts of FIGS. 26A-26D, a method 300 for determining a torque angle $\alpha$ is also provided.

The method 300 includes 302 applying a first excitation voltage to a first coil and to a second coil, with each of the first coil and the second coil located adjacent to a first target having a plurality of first teeth fixed and being fixed to rotate with an output shaft 22 or an input shaft 20. In the example embodiment, the first coil and the second coil may be the first and second output coils $L_{91}$, $L_{92}$, and the first target may be the output target 164 having a plurality of output teeth 166 and being fixed to rotate with the output shaft 22. Alternatively, the first coil and the second coil may be the first and second input coils $L_{181}$, $L_{182}$, and the first target may be the input target 148 having a plurality of input teeth 150 and being fixed to rotate with the input shaft 20

The method 300 also includes 304 generating a first voltage on a first tap on the first coil, with the first voltage varying sinusoidally with a rotation angle of the first target over a first angle range. For example, where the first coil is the first output coil $L_{91}$ with a first output tap $A_{91}$, and the first target is the output target 164 having nine output teeth 166, as in the example embodiment of the present disclosure, the first voltage varies sinusoidally with the first output rotation angle $\theta_{o1}$ of the output target 164 over the output angle range 165 of 40 degrees (1/9 of a full 360 degree rotation). This sinusoidal variation is illustrated in the graph of FIG. 19.

In the case where the first coil is the first input coil $L_{181}$, the first voltage varies sinusoidally with the first input rotation angle $\theta_{i1}$ of the input target 148 over the input angle range 149 of 20 degrees (1/18 of a full 360 degree rotation). This sinusoidal variation is illustrated in the graph of FIG. 20.

The method 300 also includes 306 generating a second voltage on a second tap on the second coil, with the second voltage varying sinusoidally with a rotation angle of the first target and shifted in phase from the first voltage. For example, where the second coil is the second output coil $L_{92}$, the second voltage varies sinusoidally with the first output rotation angle $\theta_{o1}$ of the output target 164 over the output angle range 165 of 40 degrees (1/9 of a full 360 degree rotation). This sinusoidal variation is illustrated in the graph of FIG. 19.

The phase shift between the first and second voltages may be 90 degrees as in the example embodiment, as illustrated in the graphs of FIGS. 19 and 20. However, the phase shift between the first and second voltages may be another value greater than or less than 90 degrees. Where the second coil is the second input coil $L_{182}$ of the example embodiment, the second voltage varies sinusoidally as the cosine of the first input rotation angle $\theta_{i1}$ of the input target 148 over the input angle range 149. This sinusoidal variation is illustrated in the graph of FIG. 20.

The method 300 also includes 308 measuring the first voltage and the second voltage by a processor. This step may be performed, for example, using the circuit as shown in FIG. 11. The processor, such as the first processor 184 and/or the second processor 190 may measure the first and second voltages directly, for example using an onboard analog-to-digital (A/D) converter. Alternatively, the processor may measure the first and second voltages indirectly, using one or more signals communicated from another device.

The method 300 also includes 310 scaling the first voltage by the processor to determine a first scaled coil value. In the example embodiment, the first processor 184 may be configured to scale the first output coil reference 240 to determine the first scaled output coil value 241. For example, where the first output coil reference 240 has a full-scale range between 0 and 5.0 V and has a present measured value of 4.0V (i.e. 80% of full scale), the first scaled output coil value is 0.800. The method 300 also includes 312 scaling the second voltage by the processor to determine a second scaled coil value.

The method 300 also includes 314 determining the first rotation angle of the first target within the first angle range by the processor using the first scaled coil value and the second scaled coil value. For example, with reference to the values shown in FIG. 19, and where the first target is the output target 164, with a first scaled coil value of 0.8090, and with a second scaled coil value of 0.5878, the first processor 184 may calculate first rotation angle as arctangent (0.08090/0.05878), or 54 degrees. In other words, an output rotation angle $\theta_o$ of the output target 164 is computed by dividing the measured values of sine and cosine to obtain a corresponding tangent value, then employing the arctangent function.

The method 300 also includes 316 determining by the processor a second rotation angle of a second target. In the example embodiment, the processor determines the second rotation angle in the same way as it determines the rotation of the first rotation angle of the first target. Where the first target is the output target 164 and the first rotation angle is output rotation angle $\theta_o$, then the second target is the input target 148 and the second rotation angle is the input rotation angle $\theta_i$.

The method 300 also includes 318 determining a raw torque angle $\alpha$ as the difference between the first rotation angle and the second rotation angle. This step may be performed by the processor by simply calculating the difference between the first and second rotation angles. This step may require a substep of scaling either the first or second rotation angle to compensate for the fact that input rotation angle $\theta_i$ is calculated within the input angle range 149 of 20 degrees, and the output rotation angle $\theta_o$, is calculated within the output angle range 165 of 40 degrees. For example, if each of the input shaft and the output shaft is rotated by 10 degrees in the same direction, then the input rotation angle $\theta_i$ may be determined to be 90 degrees, or half-way through the input angle range 149 of 20 degrees, and the output rotation angle $\theta_o$ may be determined to be 45 degrees, or one-fourth through the output angle range 165 of 40 degrees. The output rotation angle $\theta_o$, may then be scaled by a factor of two, resulting in a scaled output rotation angle $\theta_o'$ value of 90 degrees. The difference between the input rotation angle $\theta_i$, or 90 degrees, and the scaled output rotation angle, or 90 degrees, would then be computed to determine a raw torque angle $\alpha$ of 0 degrees.

The method 300 also includes 320 applying the first excitation voltage to a third coil located adjacent to a second target having a plurality of second teeth fixed and being fixed to rotate with one of the output shaft 22 or the input shaft 20 different than the one of the output shaft or the input shaft fixed to rotate with the first target. For example, if the first target is fixed to rotate with the input shaft 20, then the second target is fixed to rotate with the output shaft 22. Likewise, if the first target is fixed to rotate with the output shaft 22, then the second target is fixed to rotate with the input shaft 20.

The method 300 also includes 330 generating a third voltage on a third tap on the third coil, with the third voltage varying sinusoidally with the second rotation angle of the second target. The method 300 also includes 332 scaling the third voltage by the processor to determine a third scaled coil value. The method 300 also includes 334 determining two possible rotation angles of the second target using the first scaled coil value. A graphic example of the two possible rotation angles that correspond to a single first scaled coil value is shown in FIG. 21, where the first scaled coil value is a first scaled output coil value 241 having a value of 0.8090 and the two possible corresponding rotation angles are first output rotation angles $\theta_{o1}$=54 degrees or 126 degrees. This step 334 is preferably used only where one of the coils was first determined to be unavailable or incorrect, for example, by having an associated voltage that is outside of a normal operating range or which departs from an expected value by too large of an amount. If all of the coils associated with the given processor are functioning correctly, the given processor preferably determines the angle of the first target precisely as described above in steps 302 through 314. The method 300 also includes 336 determining the second rotation angle of the second target by the processor as the one of the two possible rotation angles closest to the first rotation angle of the first target. The method 300 also includes 350 applying a second excitation voltage to a fifth coil and to a sixth coil, with each of the fifth and sixth coils located adjacent to the first target.

The method 300 also includes 352 generating a fifth voltage on a fifth tap on the fifth coil, with the fifth voltage varying sinusoidally with a rotation angle of the first target. The method 300 also includes 354 generating a sixth voltage on a sixth tap on the sixth coil, with the sixth voltage varying sinusoidally with a rotation angle of the first target and shifted in phase from the sixth output voltage. The method 300 also includes 356 measuring the fifth output voltage and the sixth output voltage. The method 300 also includes 358 scaling the fifth voltage to determine a fifth scaled coil value. The method 300 also includes 360 scaling the sixth voltage to determine a sixth scaled coil value. The method 300 also includes 362 determining the rotation angle of the first target within the first angle range using the fifth scaled coil value with the sixth scaled coil value. Each of these steps 350-362 is analogous to a corresponding one of steps 302-314, described above, but determined using a different set of the output coils $L_{91}$, $L_{92}$, $L_{93}$, $L_{94}$, and/or a different set of the input coils $L_{181}$, $L_{182}$, $L_{183}$, $L_{184}$.

The method 300 also includes 370 determining an input angular region of the input shaft by an angular position sensor, with the input angular region being within a full angular range larger than each of the first angle range and the second angle range.

The method 300 also includes 372 determining a composite input shaft position by a composite input shaft position calculator using the input angular region of the input shaft together with the rotation angle of the one of the targets fixed to rotate with the input shaft. The method 300 also includes 374 applying a compensation offset to the raw torque angle by a torque angle compensator to determine a compensated torque angle. The compensation offset may include a rotational offset that varies sinusoidally with the composite input shaft position. According to an additional or alternative aspect, the compensation offset may include a linear offset that varies proportionally with the composite input shaft position.

According to a further aspect, the compensated torque angle has an accuracy within +/−0.1 degrees of rotation across the full angular range. More preferably, the compensated torque angle has an accuracy within +/−0.05 degrees of rotation across the full angular range. For example, the compensated torque angle may be provided as the high-precision torque angle $\alpha''$ of the present disclosure having an accuracy of −0.035 degrees to +0.05 degrees.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A torque angle sensor for measuring a torque angle between an input shaft and an output shaft comprising:
    an input target including a plurality of input teeth for rotation with the input shaft to establish a first input rotation angle;
    an output target including a plurality of output teeth for rotation with the output shaft to establish a first output rotation angle;
    at least one output coil disposed adjacent to said output target and inductively coupled with at least one of said plurality of output teeth;
    said at least one output coil including a first output tap having an output voltage varying with said first output rotation angle of said output target;
    at least one input coil disposed adjacent to said input target and inductively coupled with at least one of said plurality of input teeth;
    said at least one input coil including a first input tap having an input voltage varying with said first input rotation angle of said input target;
    one of said at least one output coil or said at least one input coil being electrically connected between a common ground and an AC source providing an excitation current therethrough;
    a processor configured to monitor said output voltage and determine said first output rotation angle of said output target over an output angle range;

said processor configured to monitor said input voltage and determine said first input rotation angle of said input target over an input angle range;

wherein said processor is configured to determine a rotation angle of one of said input or output targets from one of two possible rotation angles using a single value associated with one of said first input tap of said at least one input coil or said first output tap of said at least one output coil associated with the one of said input or output targets; and wherein said processor is configured to determine a correct one of said possible rotation angles as the one of said possible rotation angles closest to the rotation angle of the other one of said input or output targets.

2. The torque angle sensor of claim 1, wherein said processor is configured as a differential angle sensor, determining a torque angle as the difference between said first input rotation angle and said first output rotation angle.

3. The torque angle sensor of claim 1, further comprising:
said at least one output coil including a first output coil and a second output coil each electrically connected between a common ground and said AC source;
said first output coil including said first output tap having a voltage varying with said first output rotation angle of said output target as the sine of said first output rotation angle, and said second output coil including a second output tap having a voltage varying with said first output rotation angle of said output target as the cosine of said first output rotation angle;
said at least one input coil including a first input coil and a second input coil each being electrically connected between said common ground and said AC source;
said first input coil including said first input tap having a voltage varying with said first input rotation angle of said input target as the sine of said first input rotation angle, and said second input coil including a second input tap having a voltage varying with said first input rotation angle of said input target as the cosine of said first input rotation angle;
said second output tap being in communication with said processor, with said processor configured to determine said first output rotation angle of said output target based on relative voltages of each of said first output tap and said second output tap;
said second input tap being in communication with said processor, with said processor configured to determine said first input rotation angle of said input target based on relative voltages of each of said first input tap and said second input tap.

4. The torque angle sensor of claim 1, further comprising:
a third output coil disposed adjacent to said output target and inductively coupled with said plurality of output teeth and including a third output tap having a voltage varying with a second output rotation angle of said output target;
a third input coil disposed adjacent to said input target and inductively coupled with said plurality of input teeth and including a third input tap having a voltage varying with a second input rotation angle of said input target;
wherein said second output rotation angle is offset by a first fixed angle from said first output rotation angle;
wherein said second input rotation angle is offset by a second fixed angle from said first input rotation angle;
said third input tap being in communication with a second processor configured to determine said second input rotation angle of said input target; and
said third output tap being in communication with said second processor configured to determine said second output rotation angle of said output target.

5. The torque angle sensor of claim 1, further including an angular position sensor configured to determine an angular position of one of the input shaft or the output shaft over a full angular range being larger than each of said output angle range and said input angle range.

6. The torque angle sensor of claim 5, wherein said angular position sensor includes a plurality of inductor coils each having an inductance that varies in response to motion of a target proximate thereto.

7. The torque angle sensor of claim 6, wherein said angular position sensor is configured to measure an inductance of each of said inductor coils within said plurality of inductor coils independently.

8. The torque angle sensor of claim 6, wherein said angular position sensor is configured to switch electrical connections between two or more of said inductor coils within said plurality of inductor coils.

9. The torque angle sensor of claim 6, wherein said angular position sensor includes said plurality of inductor coils being connected in series, and wherein said angular position sensor is configured to measure voltages on nodes between adjacently connected ones of said inductor coils.

10. The torque angle sensor of claim 1, wherein said torque angle sensor is configured to determine if the input shaft or the output shaft is a primary source of torque.

11. A torque angle sensor for measuring a torque angle between an input shaft and an output shaft comprising:
an input target including a plurality of input teeth for rotation with the input shaft to establish a first input rotation angle;
an output target including a plurality of output teeth for rotation with the output shaft to establish a first output rotation angle;
at least one output coil disposed adjacent to said output target and inductively coupled with at least one of said plurality of output teeth;
said at least one output coil including a first output tap having an output voltage varying with said first output rotation angle of said output target;
at least one input coil disposed adjacent to said input target and inductively coupled with at least one of said plurality of input teeth;
said at least one input coil including a first input tap having an input voltage varying with said first input rotation angle of said input target;
one of said at least one output coil or said at least one input coil being electrically connected between a common ground and an AC source providing an excitation current therethrough;
a first processor configured to monitor said output voltage and determine said first output rotation angle of said output target over an output angle range; and
said first processor configured to monitor said input voltage and determine said first input rotation angle of said input target over an input angle range;
a third output coil disposed adjacent to said output target and inductively coupled with said plurality of output teeth and including a third output tap having a voltage varying with a second output rotation angle of said output target;
a third input coil disposed adjacent to said input target and inductively coupled with said plurality of input teeth and including a third input tap having a voltage varying with a second input rotation angle of said input target;

wherein said second output rotation angle is offset by a first fixed angle from said first output rotation angle;

wherein said second input rotation angle is offset by a second fixed angle from said first input rotation angle;

said third input tap being in communication with a second processor configured to determine said second input rotation angle of said input target;

said third output tap being in communication with said second processor configured to determine said second output rotation angle of said output target;

wherein each of said processors is in communication with each of said first input tap and said first output tap and said third input tap and said third output tap; and wherein each of said processors is configured to provide redundancy in case of a malfunction associated with the other one of said processors.

12. A torque angle sensor for measuring a torque angle between an input shaft and an output shaft comprising:

an input target including a plurality of input teeth for rotation with the input shaft to establish a first input rotation angle;

an output target including a plurality of output teeth for rotation with the output shaft to establish a first output rotation angle;

at least one output coil disposed adjacent to said output target and inductively coupled with at least one of said plurality of output teeth;

said at least one output coil including a first output tap having an output voltage varying with said first output rotation angle of said output target;

at least one input coil disposed adjacent to said input target and inductively coupled with at least one of said plurality of input teeth;

said at least one input coil including a first input tap having an input voltage varying with said first input rotation angle of said input target;

one of said at least one output coil or said at least one input coil being electrically connected between a common ground and an AC source providing an excitation current therethrough;

a processor configured to monitor said output voltage and determine said first output rotation angle of said output target over an output angle range;

said processor configured to monitor said input voltage and determine said first input rotation angle of said input target over an input angle range; and wherein said plurality of input teeth on said input target includes twice as many input teeth as the number of output teeth in said plurality of output teeth on said output target.

13. A torque angle sensor for measuring a torque angle between an input shaft and an output shaft comprising:

a differential angle sensor configured to determine a raw torque angle as the difference between an output rotation angle of an output target over an output angle range and an input rotation angle of an input target over an input angle range;

wherein said differential angle sensor is configured to determine said output rotation angle using an electrical characteristic of at least one output coil located proximate to said output target;

wherein said differential angle sensor is configured to determine said input rotation angle using an electrical characteristic of at least one input coil located proximate to said input target;

an angular position sensor configured to determine an input angular region of the input shaft over a full angular range larger than each of said output angle range and said input angle range; and a composite input shaft position calculator configured to calculate a composite input shaft position by combining the input angular region from said angular position sensor with said input rotation angle.

14. The torque angle sensor of claim 13, further comprising a torque angle compensator configured to calculate a compensated torque angle by adding a compensation value to said raw torque angle; and wherein said compensation value varies with said input rotation angle over said full angular range.

15. A method for determining a torque angle comprising:

applying a first excitation voltage to a first coil and to a second coil, with each of the first coil and the second coil located adjacent to a first target having a plurality of first teeth and being fixed to rotate with an output shaft or an input shaft;

generating a first voltage on a first tap on the first coil, with the first voltage varying sinusoidally with a first rotation angle of the first target over a first angle range;

generating a second voltage on a second tap on the second coil, with the second voltage varying sinusoidally with the first rotation angle of the first target and shifted in phase from the first voltage;

measuring the first voltage and the second voltage by a processor;

scaling the first voltage by the processor to determine a first scaled coil value;

scaling the second voltage by the processor to determine a second scaled coil value;

determining the first rotation angle of the first target within the first angle range by the processor using the first scaled coil value and the second scaled coil value;

determining by the processor a second rotation angle of a second target fixed to rotate with one of the output shaft or the input shaft different than the one of the output shaft or the input shaft fixed to rotate with the first target;

determining a raw torque angle as the difference between the first rotation angle and the second rotation angle;

determining an input angular region of the input shaft by an angular position sensor, with the input angular region being within a full angular range larger than said first angle range;

determining a composite input shaft position by a composite input shaft position calculator using the input angular region of the input shaft together with the rotation angle of the one of the first or second targets fixed to rotate with the input shaft; and applying a compensation offset to the raw torque angle by a torque angle compensator to determine a compensated torque angle.

16. The method for determining a torque angle as set forth in claim 15, further comprising:

applying a second excitation voltage to a fifth coil and to a sixth coil, with each of the fifth and sixth coils located adjacent to the first target;

generating a fifth voltage on a fifth tap on the fifth coil, with the fifth voltage varying sinusoidally with the first rotation angle of the first target;

generating a sixth voltage on a sixth tap on the sixth coil, with the sixth voltage varying sinusoidally with the first rotation angle of the first target and shifted in phase from the fifth voltage;

measuring the fifth voltage and the sixth voltage;

scaling the fifth voltage to determine a fifth scaled coil value;

scaling the sixth voltage to determine a sixth scaled coil value;

determining the first rotation angle of the first target using the fifth scaled coil value with the second scaled coil value.

17. The method for determining a torque angle as set forth in claim 15, wherein the compensation offset includes a rotational offset that varies periodically with the input shaft position.

18. The method for determining a torque angle as set forth in claim 15, wherein the compensation offset includes a linear offset that varies periodically with the input shaft position.

19. The method for determining a torque angle as set forth in claim 15, wherein the compensated torque angle has an accuracy within +/−0.1 degrees of rotation across the full angular range.

20. A method for determining a torque angle comprising:

applying a first excitation voltage to a first coil and to a second coil, with each of the first coil and the second coil located adjacent to a first target having a plurality of first teeth and being fixed to rotate with an output shaft or an input shaft;

generating a first voltage on a first tap on the first coil, with the first voltage varying sinusoidally with a first rotation angle of the first target over a first angle range;

generating a second voltage on a second tap on the second coil, with the second voltage varying sinusoidally with the first rotation angle of the first target and shifted in phase from the first voltage;

measuring the first voltage and the second voltage by a processor;

scaling the first voltage by the processor to determine a first scaled coil value;

scaling the second voltage by the processor to determine a second scaled coil value;

determining the first rotation angle of the first target within the first angle range by the processor using the first scaled coil value and the second scaled coil value;

determining by the processor a second rotation angle of a second target;

determining a raw torque angle as the difference between the first rotation angle and the second rotation angle;

applying the first excitation voltage to a third coil located adjacent to the second target having a plurality of second teeth and being fixed to rotate with one of the output shaft or the input shaft different than the one of the output shaft or the input shaft fixed to rotate with the first target;

generating a third voltage on a third tap on the third coil, with the third voltage varying sinusoidally with the second rotation angle of the second target;

scaling the third voltage by the processor to determine a third scaled coil value;

determining two possible rotation angles of the second target using the third scaled coil value; and determining the second rotation angle of the second target by the processor as the one of the two possible rotation angles closest to the first rotation angle of the first target.

* * * * *